US012222677B2

(12) United States Patent
Watanabe et al.

(10) Patent No.: US 12,222,677 B2
(45) Date of Patent: Feb. 11, 2025

(54) FINE PARTICLE, EXTERNAL ADDITIVE FOR TONER, TONER, TWO-COMPONENT DEVELOPER, AND METHOD FOR MANUFACTURING TONER

(71) Applicant: CANON KABUSHIKI KAISHA, Tokyo (JP)

(72) Inventors: Hiroki Watanabe, Chiba (JP); Ichiro Kanno, Chiba (JP); Masaharu Miura, Ibaraki (JP); Hayato Ida, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 476 days.

(21) Appl. No.: 17/648,330

(22) Filed: Jan. 19, 2022

(65) Prior Publication Data

US 2022/0236654 A1 Jul. 28, 2022

(30) Foreign Application Priority Data

Jan. 25, 2021 (JP) ................................ 2021-009564
Jan. 25, 2021 (JP) ................................ 2021-009603
Aug. 31, 2021 (JP) ................................ 2021-141208
Dec. 24, 2021 (JP) ................................ 2021-211031

(51) Int. Cl.
*G03G 9/097* (2006.01)
*G03G 9/08* (2006.01)

(52) U.S. Cl.
CPC ....... *G03G 9/09775* (2013.01); *G03G 9/0819* (2013.01); *G03G 9/0821* (2013.01)

(58) Field of Classification Search
CPC . G03G 9/09775; G03G 9/0819; G03G 9/0821
See application file for complete search history.

(56) References Cited

U.S. PATENT DOCUMENTS 9,057,970 B2 6/2015 Ida et al.
9,152,088 B1 10/2015 Kobori et al.
9,348,247 B2 5/2016 Ida et al.
9,348,253 B2 5/2016 Kanno et al.
9,417,540 B2 8/2016 Hashimoto et al.
(Continued)

FOREIGN PATENT DOCUMENTS

EP 3 674 799 A1 7/2020
EP 3 674 804 A1 7/2020
(Continued)

OTHER PUBLICATIONS

English machine translation of the description of JP-2008145491-A (Year: 2008).*
(Continued)

*Primary Examiner* — Peter L Vajda
*Assistant Examiner* — Boone Alexander Evans
(74) *Attorney, Agent, or Firm* — VENABLE LLP

(57) ABSTRACT

A fine particle of a silicon polymer having a siloxane group and a silanol group, wherein a moisture adsorption amount of the fine particle at a temperature of 30° C. and a humidity of 80% RH is from 1.0 mg/g to 22.0 mg/g, an amount of the silanol group of the fine particle measured by a titration method using KOH is from 0.012 mmol/g to 0.120 mmol/g, and a number average particle diameter of primary particle of the fine particle is from 0.05 μm to 0.30 μm.

10 Claims, 1 Drawing Sheet

(56) References Cited

U.S. PATENT DOCUMENTS

| | | | | |
|---|---|---|---|---|
| 9,436,112 | B2 | 9/2016 | Iwasaki et al. | |
| 9,540,483 | B2 | 1/2017 | Ida et al. | |
| 9,651,883 | B2 | 5/2017 | Hama et al. | |
| 9,665,023 | B2 | 5/2017 | Kamae et al. | |
| 9,665,026 | B2 | 5/2017 | Iwasaki et al. | |
| 9,696,644 | B2 | 7/2017 | Ida et al. | |
| 9,809,682 | B2 * | 11/2017 | Ishizu | G03G 9/09725 |
| 9,897,934 | B2 | 2/2018 | Tamura et al. | |
| 9,915,885 | B2 | 3/2018 | Katsumata et al. | |
| 9,969,834 | B2 | 5/2018 | Ohtsu et al. | |
| 10,012,918 | B2 | 7/2018 | Ishigami et al. | |
| 10,012,920 | B2 | 7/2018 | Shibata et al. | |
| 10,012,921 | B2 | 7/2018 | Kamae et al. | |
| 10,036,970 | B2 | 7/2018 | Kanno et al. | |
| 10,078,281 | B2 | 9/2018 | Ida et al. | |
| 10,082,743 | B2 | 9/2018 | Hama et al. | |
| 10,088,765 | B2 | 10/2018 | Miyakai et al. | |
| 10,133,201 | B2 | 11/2018 | Kamae et al. | |
| 10,146,146 | B2 | 12/2018 | Komatsu et al. | |
| 10,175,595 | B2 | 1/2019 | Onozaki et al. | |
| 10,197,936 | B2 | 2/2019 | Onozaki et al. | |
| 10,203,619 | B2 | 2/2019 | Yamashita et al. | |
| 10,216,108 | B2 | 2/2019 | Iwasaki et al. | |
| 10,228,629 | B2 | 3/2019 | Tamura et al. | |
| 10,234,777 | B2 | 3/2019 | Ohtsu et al. | |
| 10,274,851 | B2 | 4/2019 | Hashimoto et al. | |
| 10,353,312 | B2 | 7/2019 | Kamae et al. | |
| 10,401,748 | B2 | 9/2019 | Hashimoto et al. | |
| 10,423,086 | B2 | 9/2019 | Hama et al. | |
| 10,423,090 | B2 | 9/2019 | Ohtsu et al. | |
| 10,451,985 | B2 | 10/2019 | Takahashi et al. | |
| 10,451,986 | B2 | 10/2019 | Sano et al. | |
| 10,451,990 | B2 | 10/2019 | Kamae et al. | |
| 10,474,049 | B2 | 11/2019 | Onozaki et al. | |
| 10,514,624 | B2 | 12/2019 | Tamura et al. | |
| 10,551,759 | B2 | 2/2020 | Watanabe et al. | |
| 10,564,560 | B2 | 2/2020 | Onozaki et al. | |
| 10,599,060 | B2 | 3/2020 | Kanno et al. | |
| 10,642,178 | B2 | 5/2020 | Yamashita et al. | |
| 10,656,545 | B2 | 5/2020 | Kamae et al. | |
| 10,747,132 | B2 | 8/2020 | Takahashi et al. | |
| 10,768,543 | B2 | 9/2020 | Tsujimoto et al. | |
| 10,775,710 | B1 | 9/2020 | Kamae et al. | |
| 10,859,931 | B2 | 12/2020 | Hashimoto et al. | |
| 10,877,386 | B2 | 12/2020 | Murayama et al. | |
| 10,935,902 | B2 | 3/2021 | Kanno et al. | |
| 10,955,765 | B2 | 3/2021 | Onozaki et al. | |
| 10,969,705 | B2 | 4/2021 | Shirayama et al. | |
| 11,029,617 | B2 | 6/2021 | Chimoto et al. | |
| 11,131,939 | B2 | 9/2021 | Hama et al. | |
| 11,181,848 | B2 | 11/2021 | Ochi et al. | |
| 11,249,410 | B2 | 2/2022 | Takahashi et al. | |
| 2003/0138715 | A1 | 7/2003 | Barthel | |
| 2005/0107520 | A1 * | 5/2005 | Gottschalk-Gaudig | C08L 83/06 524/556 |
| 2008/0226998 | A1 | 9/2008 | Ishii | |
| 2013/0108955 | A1 | 5/2013 | Shibata et al. | |
| 2013/0288173 | A1 | 10/2013 | Hashimoto et al. | |
| 2014/0295341 | A1 | 10/2014 | Fomitchev | |
| 2014/0329176 | A1 | 11/2014 | Kanno et al. | |
| 2015/0099227 | A1 | 4/2015 | Ida et al. | |
| 2016/0109820 | A1 | 4/2016 | Hashimoto et al. | |
| 2016/0319077 | A1 | 11/2016 | Ishizu | |
| 2018/0275540 | A1 | 9/2018 | Matsuo et al. | |
| 2018/0314176 | A1 | 11/2018 | Ikeda et al. | |
| 2018/0329322 | A1 | 11/2018 | Kamikura | |
| 2018/0329332 | A1 * | 11/2018 | Tominaga | G03G 9/09725 |
| 2018/0364601 | A1 * | 12/2018 | Onozaki | G03G 9/08795 |
| 2021/0063903 | A1 | 3/2021 | Shibata et al. | |
| 2021/0141315 | A1 | 5/2021 | Kamae et al. | |
| 2021/0181647 | A1 | 6/2021 | Hashimoto et al. | |
| 2021/0181649 | A1 | 6/2021 | Kanno et al. | |
| 2021/0181650 | A1 | 6/2021 | Hama et al. | |
| 2021/0181651 | A1 | 6/2021 | Kanno et al. | |
| 2021/0278774 | A1 | 9/2021 | Hashimoto et al. | |
| 2021/0278775 | A1 | 9/2021 | Kamae et al. | |
| 2021/0286282 | A1 | 9/2021 | Kobori et al. | |
| 2021/0397106 | A1 | 12/2021 | Kobori et al. | |

FOREIGN PATENT DOCUMENTS

| | | | | |
|---|---|---|---|---|
| JP | 2007-99582 | A | 4/2007 | |
| JP | 2008145491 | A * | 6/2008 | |
| JP | 2008-189545 | A | 8/2008 | |
| JP | 2018-4949 | A | 1/2018 | |
| JP | 2018-72389 | A | 5/2018 | |
| JP | 2018194837 | A * | 12/2018 | G03G 9/08 |
| JP | 2020-187158 | A | 11/2020 | |
| WO | 2013/063291 | A1 | 5/2013 | |
| WO | 2015/107961 | A1 | 7/2015 | |

OTHER PUBLICATIONS

English machine translation of the description of JP-2018194837-A (Year: 2018).*
U.S. Appl. No. 17/457,766, Yuya Chimoto, filed Dec. 6, 2021.
U.S. Appl. No. 17/457,822, Hisasuke Kajihara, filed Dec. 6, 2021.
U.S. Appl. No. 17/536,853, Hisasuke Kajihara, filed Nov. 29, 2021.
U.S. Appl. No. 17/542,006, Masaharu Miura, filed Dec. 3, 2021.
U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/648,588, Daisuke Tsujimoto, filed Jan. 21, 2022.
U.S. Appl. No. 17/654,461, Yukihiro Abe, filed Mar. 11, 2022.
U.S. Appl. No. 17/654,481, Kazuki Murata, filed Mar. 11, 2022.

* cited by examiner

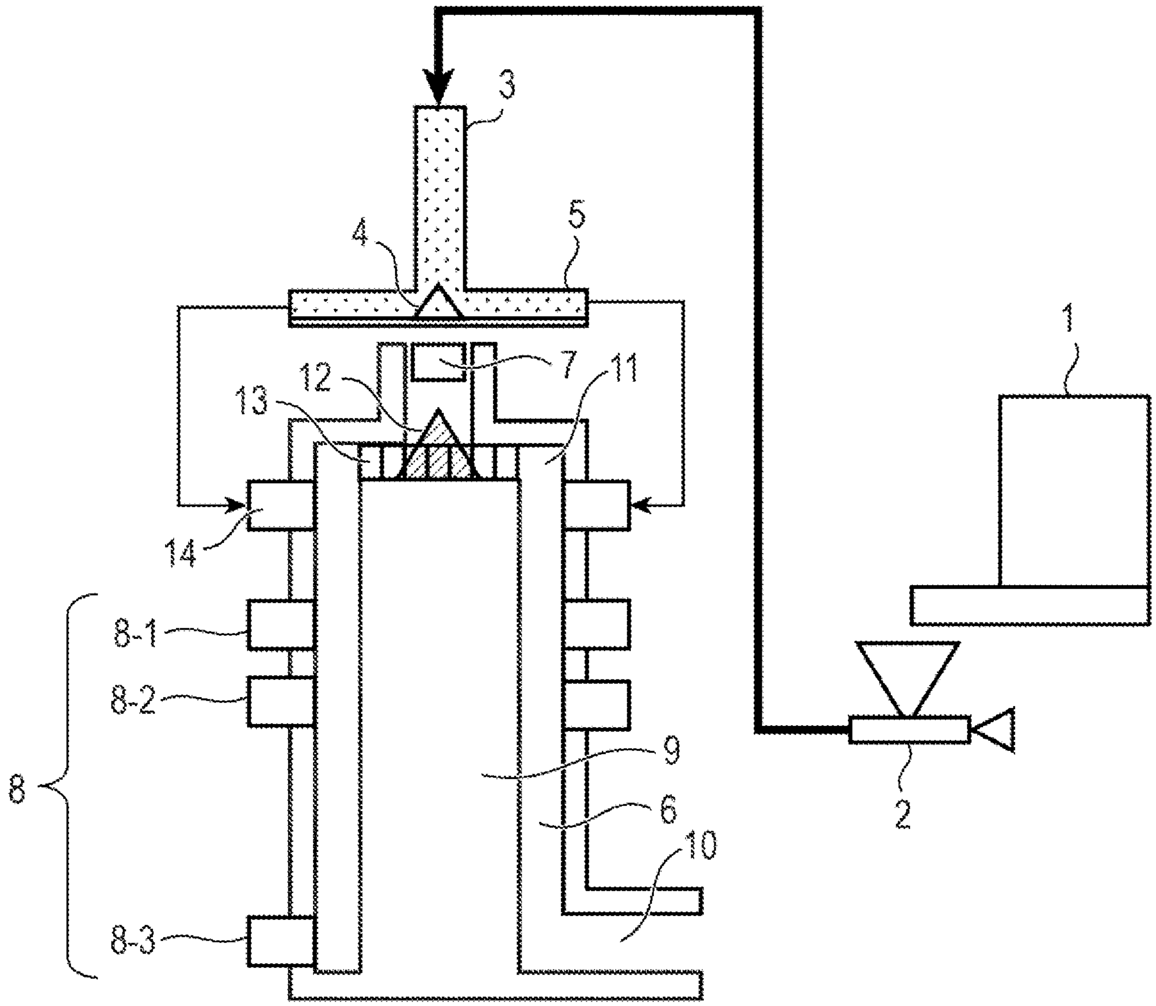
3
4
5
1
7
12
11
13
14
8-1
8-2
8
9
6
2
10
8-3

FINE PARTICLE, EXTERNAL ADDITIVE FOR TONER, TONER, TWO-COMPONENT DEVELOPER, AND METHOD FOR MANUFACTURING TONER

BACKGROUND OF THE INVENTION

Field of the Invention

The present disclosure relates to a fine particle, an external additive for toner, a toner used in an electrophotographic method, a two-component developer using the toner, and a method for manufacturing a toner.

Description of the Related Art

In recent years, with the widespread use of electrophotographic full-color copiers, there is an increasing demand for electrophotographic toners suitable for high-speed printing and having environmental stability and long service life.

Conventionally, silica is widely known as an external additive used for toners. In general, examples have been reported in which silica obtained by a dry method or a wet method (sol-gel method) is subjected to surface treatment to increase hydrophobicity. For example, Japanese Patent Application Publication No. 2007-099582 includes an example in which highly hydrophobic spherical sol-gel silica fine particles are added to a toner base particle to improve the charge stability of the toner.

SUMMARY OF THE INVENTION

However, when an image is output in a high-temperature and high-humidity environment for a long period of time, the silica present on the toner surface is affected by humidity, the charge quantity of the toner may decrease and the image density and image density uniformity may decrease, or a high-quality image may not be obtained. Further, when an image is output in a low-temperature and low-humidity environment for a long period of time, the silica present on the toner surface may also be affected by humidity and the toner may be excessively charged. In that case, it becomes difficult for the toner to fly from a developing unit, and the image density and image density uniformity may decrease, or a high-quality image may not be obtained. Thus, when the image output environment is different, there is still room for improvement in terms of image density, image density uniformity, and image quality governed by the charge stability of the toner.

Meanwhile, as indicated in WO 2015/107961 and Japanese Patent Application Publication No. 2018-004949, there are examples in which polyalkylsilsesquioxane fine particles are added to toner particles to improve the fluidity and charge stability of the toner.

However, it was found that in any of the techniques described in these documents, there is room for improvement in terms of image density, image density uniformity, and image quality governed by the charge stability of the toner when an image is output in a high-temperature and high-humidity environment and a low-temperature and low-humidity environment for a long period of time.

The present disclosure provides a fine particle, an external additive for toner, a toner, a two-component developer, and a method for producing a toner that ensure charge stability and favorable image density, image density uniformity, and image quality even when an image is output in a high-temperature and high-humidity environment and a low-temperature and low-humidity environment for a long period of time.

The present disclosure relates to a fine particle of a silicon polymer having a siloxane group and a silanol group, wherein

- a moisture adsorption amount of the fine particle at a temperature of 30° C. and a humidity of 80% RH is from 1.0 mg/g to 22.0 mg/g,
- an amount of the silanol group of the fine particle measured by a titration method using KOH is from 0.012 mmol/g to 0.120 mmol/g, and
- a number average particle diameter of primary particle of the fine particle is from 0.05 μm to 0.30 μm.

Also, the present disclosure relates to an external additive for toner comprising the above fine particle.

Also, the present disclosure relates to a toner comprising a toner particle and an external additive for toner, wherein the external additive for toner is the above external additive for toner.

Also, the present disclosure relates to a two-component developer comprising a toner and a magnetic carrier, wherein the toner is the above toner.

Also, the present disclosure relates to a method for manufacturing the above toner, the method comprising:

- a mixing step of mixing the toner particle and the external additive for toner to obtain a toner particle mixture; and
- a heat treatment step of heat-treating the toner particle mixture.

The present disclosure can provide a fine particle, an external additive for toner, a toner, a two-component developer, and a method for producing a toner that ensure charge stability and favorable image density, image density uniformity, and image quality even when an image is output in a high-temperature and high-humidity environment and a low-temperature and low-humidity environment for a long period of time. Further features of the present invention will become apparent from the following description of exemplary embodiments with reference to the attached drawings.

BRIEF DESCRIPTION OF THE DRAWINGS

The FIGURE shows an example of a heat treatment apparatus.

DESCRIPTION OF THE EMBODIMENTS

In the present disclosure, the notations "from XX to YY" and "XX to YY" representing a numerical value range denote, unless otherwise stated, a numerical value range that includes the lower limit and the upper limit thereof, as endpoints. In a case where numerical value ranges are described in stages, the upper limits and the lower limits of the respective numerical value ranges can be combined arbitrarily.

The present inventors consider that the above effects are exhibited according to the following mechanism.

The fine particles are characterized by a small amount of moisture adsorbed at a temperature of 30° C. and a humidity of 80% RH. Since the fine particles do not easily adsorb moisture in a high-temperature and high-humidity environment, it is possible to suppress a decrease in the charge quantity of the toner. Therefore, the toner has charge stability and favorable image density, image density uniformity, and image quality in a high-temperature and high-humidity environment for a long period of time.

Further, the fine particles are characterized in that the amount of silanol groups present on the surface of the fine particles is moderately large, even though the amount of moisture adsorbed at a temperature of 30° C. and a humidity of 80% RH is small. Since the silanol group leaks the excessive charge of the toner, it is possible to suppress the excessive charge of the toner in a low-temperature and low-humidity environment. Therefore, the toner has favorable charge stability, image density, image density uniformity, and image quality in a low-temperature and low-humidity environment for a long period of time.

Sol-gel silica fine particles and polyalkylsilsesquioxane fine particles, which have been used as an external additive for toner, include a siloxane bond (Si—O—Si) as a main component. Usually, since silanol groups are present at the ends of the sol-gel silica fine particles and polyalkylsilsesquioxane fine particles, unreacted residual silanol groups are present on the surface and inside of the particles. Since the silanol group easily adsorbs moisture, the amount of moisture adsorbed at a temperature of 30° C. and a humidity of 80% RH increases. Therefore, in a high-temperature and high-humidity environment, the fine particles adsorb moisture and the charge quantity of the toner decreases.

By contrast, there is a method for reducing the amount of adsorbed moisture by trimethylsilylation (surface treatment) by coupling the residual silanol group with a silane compound or the like. However, since the sol-gel silica fine particles inherently have a large amount of residual silanol groups, the amount of residual silanol groups is large even after surface treatment, and the amount of moisture adsorbed at a temperature of 30° C. and a humidity of 80% RH is large. Therefore, in a high-temperature and high-humidity environment, the fine particles adsorb moisture and the charge quantity of the toner decreases.

Further, the polyalkylsilsesquioxane fine particles make it possible to reduce the amount of silanol groups on the surface by surface treatment, and to reduce the amount of moisture adsorbed at a temperature of 30° C. and a humidity of 80% RH. However, when the amount of moisture adsorbed is sufficiently reduced, the amount of silanol groups on the surface is also reduced, so that the toner is excessively charged in a low-temperature and low-humidity environment.

In the fine particles satisfying the above composition, the amount of moisture adsorbed at a temperature of 30° C. and a humidity of 80% RH is small, and a large amount of silanol groups is present on the surface. Therefore, even when an image is output in a high-temperature and high-humidity environment and a low-temperature and low-humidity environment for a long period of time, it is possible to provide fine particle, an external additive for toner, and a toner that ensure charge stability, favorable image density and image density uniformity, and favorable image quality.

The amount of moisture adsorbed on the fine particles at a temperature of 30° C. and a humidity of 80% RH is from 1.0 mg/g to 22.0 mg/g. The amount of moisture adsorbed is preferably from 2.0 mg/g to 15.0 mg/g, more preferably from 3.0 mg/g to 12.0 mg/g, even more preferably from 4.0 mg/g to 9.5 mg/g, and still more preferably from 4.5 mg/g to 9.0 mg/g.

When the amount of moisture adsorbed is within the above range, the fine particles are unlikely to adsorb water in a high-temperature and high-humidity environment, so that it is possible to suppress a decrease in the charge quantity of the toner. Therefore, the charge stability, image density, image density uniformity, and image quality are improved in a high-temperature and high-humidity environment for a long period of time.

The amount of silanol groups of the fine particles measured by a titration method using KOH is from 0.012 mmol/g to 0.120 mmol/g. The amount of the silanol groups is preferably from 0.012 mmol/g to 0.100 mmol/g, and more preferably from 0.014 mmol/g to 0.050 mmol/g.

Regarding the titration method using KOH, a specific method will be described hereinbelow, but the amount of silanol groups determined by the titration method represents the amount of silanol groups present on the surface of the fine particles. When the amount of silanol groups of the fine particles measured by the titration method using KOH is in the above range, it is possible to suppress excessive charge of the toner in a low-temperature and low-humidity environment. Therefore, the charge stability can be maintained and the image density, image density uniformity, and image quality are improved in a low-temperature and low-humidity environment for a long period of time.

Silica fine particles and organosilicon polymer fine particles used as the conventional external additives for toner have been surface-treated in order to reduce the amount of moisture adsorbed at a temperature of 30° C. and a humidity of 80% RH. However, the amount of silanol groups on the surface is reduced, and the toner tends to be excessively charged in a low-temperature and low-humidity environment.

By contrast, the fine particles of the present disclosure make it possible to control the amount of silanol groups on the surface within an appropriate range while reducing the amount of adsorbed moisture by devising the ratio of the silane monomer described hereinbelow. The conventional organosilicon polymer fine particles have a high proportion of trifunctional silane, and the conventional sol-gel silica fine particles have a high proportion of tetrafunctional silane. Therefore, surface treatment is required to reduce the amount of moisture adsorbed.

Meanwhile, by increasing the proportion of bifunctional silane and monofunctional silane, it is possible to reduce the amount of moisture adsorbed on the fine particles. It was also found that increasing the proportion of bifunctional silane or monofunctional silane reduces the amount of silanol groups on the surface. By using tetrafunctional silanes and trifunctional silanes while increasing the proportion of bifunctional silanes and monofunctional silanes, it is possible to keep both the amount of moisture adsorbed and the amount of silanol groups on the fine particles within an unprecedented preferable range.

The number average particle diameter of the primary particles of the fine particles is from 0.05 μm to 0.30 μm. The number average particle diameter of the primary particles of the fine particles is preferably from 0.07 μm to 0.20 μm, and more preferably from 0.08 μm to 0.18 μm.

When the number average particle diameter of the primary particles of the fine particles is within the above range, it becomes easy to uniformly coat a toner particle with an external additive. Further, since the stress on the toner can be suppressed, the effect of charge stability can be easily obtained. Therefore, the image density, image density uniformity, and image quality are improved in a high-temperature and high-humidity environment and a low-temperature and low-humidity environment for a long period of time.

A method for producing the fine particles of the silicon polymer is not particularly limited, but preferably involves forming the fine particles through hydrolysis and polycondensation reaction of a silicon compound (silane monomer) obtained by the sol-gel method. Specifically, it is preferable that a mixture including a bifunctional silane having two siloxane bonds and a tetrafunctional silane having four siloxane bonds be polymerized by hydrolysis and polycondensation reaction to form fine particles. Silane monomers such as bifunctional silanes and tetrafunctional silanes will be described hereinbelow.

That is, the silicon polymer is preferably a polycondensation polymer of at least one silicon compound selected from the group consisting of bifunctional silanes and at least one silicon compound selected from the group consisting of tetrafunctional silanes. The proportion of bifunctional silanes is preferably 50 mol % to 73 mol %, more preferably 54 mol % to 70 mol %, and still more preferably 61 mol % to 65 mol %. The proportion of tetrafunctional silanes is preferably 27 mol % to 50 mol %, more preferably 30 mol % to 46 mol %, and still more preferably 35 mol % to 39 mol %.

The present inventors have found that the proportion of bifunctional silanes and the proportion of tetrafunctional silanes are important in the method for producing fine particles. By controlling the proportion of bifunctional silanes and the proportion of tetrafunctional silanes within the above range, both the amount of moisture adsorbed at a temperature of 30° C. and a humidity of 80% RH and the amount of silanol groups of the fine particles measured by the titration method using KOH are easily controlled to the preferred ranges. Further, by adding monofunctional silanes and trifunctional silanes in addition to the bifunctional silanes and tetrafunctional silanes, the amount of moisture adsorbed at a temperature of 30° C. and a humidity of 80% RH and the amount of silanol groups of the fine particles measured by the titration method using KOH can also be adjusted.

In addition to the mixing ratio of the above monomers, the amount of moisture adsorbed at a temperature of 30° C. and a humidity of 80% RH and the amount of silanol groups of the fine particles measured by the titration method using KOH can also be adjusted by adjusting the solvent temperature during the hydrolysis and condensation reaction (for example, the temperature of the polycondensation step), the type of catalyst, the stirring time, the pH of the solution, and the like.

The amount of moisture adsorbed can be increased by lowering the stirring temperature in the condensation step, and can be reduced by raising the stirring temperature in the condensation step.

Further, for example, the amount of silanol groups on the surface of the fine particles can be increased by lowering the stirring temperature in the polycondensation step or reducing the amount of the catalyst, and can be reduced by raising the stirring temperature in the condensation step or increasing the amount of the catalyst.

The fine particle and external additive for toner have a particle of a silicon polymer having a siloxane bond. The particle of the silicon polymer preferably contains the silicon polymer at 90% by mass or more, and more preferably at 95% by mass or more.

The method for producing the silicon polymer particles is not particularly limited, and for instance the silicon polymer particles may be obtained through dropping of a silane compound onto water, to elicit hydrolysis and a condensation reaction mediated by a catalyst, followed by filtration and drying of the obtained suspension. Particle diameter can be controlled on the basis of for instance the type of the catalyst, the compounding ratio, the reaction start temperature and the dropping time. Examples of the catalyst include, although not limited thereto, acidic catalysts such as hydrochloric acid, hydrofluoric acid, sulfuric acid and nitric acid, and basic catalysts such as aqueous ammonia, sodium hydroxide and potassium hydroxide.

The silicon polymer particles are preferably produced in accordance with the method below. Specifically, the method preferably includes a first step of obtaining a hydrolysis product of a silicon compound; a second step of mixing the resulting hydrolysis product and an alkaline aqueous medium, to elicit a polycondensation reaction of the hydrolysis product; and a third step of mixing the polycondensation reaction product and an aqueous solution, to elicit particle formation. In some cases, hydrophobicized spherical silicon polymer particles may be obtained by further mixing a hydrophobic agent into a dispersion of spherical silicon polymer particles.

In the first step, the silicon compound and a catalyst are brought into contact with each other by a method such as stirring or mixing in an aqueous solution in which an acidic or alkaline substance serving as a catalyst is dissolved in water. As the catalyst, a known catalyst can be preferably used. Specifically, examples of suitable acidic catalysts include acetic acid, hydrochloric acid, hydrofluoric acid, sulfuric acid, nitric acid, and the like, and examples of suitable basic catalysts include aqueous ammonia, sodium hydroxide, potassium hydroxide, and the like.

The amount of the catalyst used may be adjusted, as appropriate, depending on the silicon compound and the type of catalyst. Preferably, the amount of the catalyst used is selected in the range of from $1\times10^{-3}$ part by mass to 1 part by mass with respect to 100 parts by mass of water used when hydrolyzing the silicon compound.

Where the amount of the catalyst used is $1\times10^{-3}$ parts by mass or more, the reaction proceeds sufficiently. Meanwhile, where the amount of the catalyst used is 1 part by mass or less, the concentration of impurities remaining in the fine particles becomes low, and hydrolysis becomes easy. The amount of water used is preferably from 2 mol to 15 mol with respect to 1 mol of the silicon compound. When the amount of water is 2 mol or more, the hydrolysis reaction proceeds sufficiently, and when the amount of water is 15 mol or less, the productivity is improved.

The reaction temperature is not particularly limited, and the reaction may be conducted at normal temperature or in a heated state, but preferably the reaction is conducted in a state where the temperature is held at from 10 to 60° C., since in that case the hydrolysis product is obtained in a short time and partial condensation reactions of the generated hydrolysis product can be suppressed. The reaction time is not particularly limited, and may be selected as appropriate taking into consideration the reactivity of the silicon compound that is used, the composition of the reaction solution resulting from formulating the silicon compound, the acid and water, and productivity.

In the method for producing the silicon polymer particles, the second step involves mixing the starting solution obtained in the first step and an alkaline aqueous medium, to elicit a polycondensation reaction of a particle precursor. A polycondensation reaction solution is obtained as a result. The alkaline aqueous medium is a solution obtained by mixing an alkaline component, water and, as needed, an organic solvent or the like.

The alkaline component used in the alkaline aqueous medium exhibits basicity, and acts as a neutralizer of the catalyst used in the first step, and as a catalyst of the polycondensation reaction in the second step. Examples of such alkaline components include alkali metal hydroxides such as lithium hydroxide, sodium hydroxide and potassium hydroxide; ammonia; and organic amines such as monomethylamine and dimethylamine.

The use amount of the alkaline component is an amount such that the alkaline component neutralizes an acid and effectively acts as a catalyst of the polycondensation reaction; in a case for instance where ammonia is used as the alkaline component, the amount of the alkaline component may ordinarily be selected within the range from 0.01 mass % to 12.5 mass % relative to 100 parts by mass of the mixture with water and the organic solvent.

In the second step, an organic solvent may be further used in addition to the alkaline component and water, in order to prepare the alkaline aqueous medium. The organic solvent is not particularly limited, so long as it is compatible with water, but an organic solvent is preferable herein that dissolves 10 g or more of water per 100 g at normal temperature and a normal pressure.

Specific examples of the organic solvent include alcohols such as methanol, ethanol, n-propanol, 2-propanol and butanol; polyhydric alcohols such as ethylene glycol, diethylene glycol, propylene glycol, glycerine, trimethylolpropane and hexanetriol; ethers such as ethylene glycol monoethyl ether, acetone, diethyl ether, tetrahydrofuran and diacetone alcohol; and amide compounds such as dimethylformamide, dimethylacetamide and N-methylpyrrolidone.

Alcohol solvents such as methanol, ethanol, 2-propanol or butanol are preferable among the organic solvents enumerated above. In terms of hydrolysis and a dehydration condensation reaction, it is more preferable to select, as the organic solvent, the same alcohol as the alcohol that is eliminated.

The third step involves mixing the polycondensation reaction product obtained in the second step with an aqueous solution, to elicit formation of particles. Water (tap water, pure water or the like) can be suitably used herein as the aqueous solution, but components that are compatible with water, such as salts, acids, alkalis, organic solvents, surfactants or water-soluble polymers may be further added to the water. The temperatures of the polycondensation reaction solution and of the aqueous solution at the time of mixing are not particularly limited, and herein a range from 5 to 70° C. is suitably selected taking into consideration for instance the composition of the solutions, and productivity.

A known method may be adopted, without particular limitations, as the method for recovering the silicon polymer particles. For instance a floating powder may be scooped or filtered. The filtration method is preferable since the operation involved is simple and convenient. The filtration method is not particularly limited, and a known apparatus for vacuum filtration, centrifugal filtration, pressure filtration or the like may be selected herein. The filter paper, filter, filter cloth or the like used for filtration are not particularly limited so long these are industrially available, and may be selected as appropriate depending on the apparatus that is used.

The hydrophobicity of the silicon polymer particles may be adjusted by treating the surface of the silicon polymer particles using a known means such as a silane coupling agent or silicone oil.

The monomers used can be selected, as appropriate, depending on the compatibility with the solvent and the catalyst, hydrolyzability, etc., but the tetrafunctional silane is preferably tetraethoxysilane. The bifunctional silane is preferably dimethyldimethoxysilane.

The silicon polymer is preferably a polycondensation polymer of at least one silicon compound selected from the group consisting of silicon compounds having a structure represented by a following formula (A).

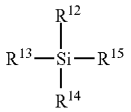

(A)

In the formula (A), $R^{12}$, $R^{13}$, $R^{14}$ and $R^{15}$ independently represent an alkyl group having from 1 to 6 (preferably from 1 to 3, and more preferably 1 or 2) carbon atoms, a phenyl group or a reactive group (for example, a halogen atom, a hydroxy group, an acetoxy group, or an alkoxy group (preferably having from 1 to 6 carbon atoms, and more preferably from 1 to 3 carbon atoms). At least one of $R^{12}$, $R^{13}$, $R^{14}$ and $R^{15}$ is the reactive group.

$R^{12}$, $R^{13}$, $R^{14}$ and $R^{15}$ are independently preferably an alkyl group having from 1 to 6 carbon atoms (preferably from 1 to 3 carbon atoms, and more preferably 1 or 2 carbon atoms) or an alkoxy group (preferably having from 1 to 6 carbon atoms, and more preferably from 1 to 3 carbon atoms).

In order to obtain the silicon polymer particles, it is possible to use a silicon compound (tetrafunctional silane) having four reactive groups in one molecule of the formula (A), an organosilicon compound (trifunctional silane) in which $R^{12}$ in the formula (A) is an alkyl group or a phenyl group and which has three reactive groups ($R^{13}$, $R^{14}$, $R^{15}$), an organosilicon compound (bifunctional silane) in which $R^{12}$ and $R^{13}$ in the formula (A) are each an alkyl group or a phenyl group and which has two reactive groups ($R^{14}$, $R^{15}$), and an organosilicon compound (monofunctional silane) in which $R^{12}$, $R^{13}$, $R^{14}$ in the formula (A) are each an alkyl group or a phenyl group and which has one reactive group ($R^{15}$).

These reactive groups are hydrolyzed, addition polymerized and condensation polymerized to form a crosslinked structure, and silicon polymer particles can be obtained. Hydrolysis, addition polymerization and condensation polymerization of $R^{13}$, $R^{14}$ and $R^{15}$ can be controlled by reaction temperature, reaction time, reaction solvent and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The BET specific surface area of the fine particles is preferably from 30 $m^2/g$ to 250 $m^2/g$, and more preferably from 50 $m^2/g$ to 150 $m^2/g$. The fact that the BET specific surface area of the fine particles is in the above range indicates that extremely fine irregularities are suitably present on the surface of the fine particles. The suitable presence of fine irregularities on the surface of the fine particles results in a greater effect of suppressing a decrease in the charge quantity of the toner in a high-temperature and high-humidity environment for a long period of time, and a greater effect of suppressing the excessive charge of the toner in a low-temperature and low-humidity environment. The BET specific surface area can be controlled by hydrolysis and condensation conditions and the amount of catalyst.

The fine particles are preferably surface-treated with at least one compound selected from the group consisting of an alkylsilazane, a cyclic dimethylpolysiloxane, a chlorosilane, a fluorosilane and a silicone oil. It is more preferable that the fine particles be surface-treated with an alkylsilazane. Surface treatment of the fine particles with the above compound results in a greater effect of suppressing a decrease in the charge quantity of the toner in a high-temperature and high-humidity environment for a long period of time.

Examples of the alkylsilazane include hexamethyldisilazane and the like. Examples of the cyclic dimethylpolysiloxane include octamethylcyclotetrasiloxane, decamethylcyclopentasiloxane, and the like. Examples of the chlorosilane include chlorotrimethylsilane, dimethyldichlorosilane, and the like. Examples of the fluorosilane include trifluoropropyltrimethoxysilane, trifluoropropyltriethoxysilane, and the like. Examples of the silicone oil include dimethyl silicone oil and the like.

In the chart obtained by the measurement of $^{29}$Si-NMR of the fine particles, where the total peak area corresponding to the silicon polymer is denoted by A and the peak area corresponding to the structure represented by the following formula (a) is denoted by S3, the A and the S3 preferably satisfy the following formula (1).

$$S3/A \leq 0.40 \quad (1)$$

Further, S3/A≤0.20 is more preferable, S3/A≤0.10 is more preferable, and S3/A≤0.05 is further preferable. The lower limit is not particularly limited, but is preferably 0.00≤S3/A. In the structure (a), $R^1$ represents an alkyl group having 1 to 6 carbon atoms.

When the fine particles satisfy the formula (1), a greater effect of suppressing the decrease in the charge quantity of the toner in a high-temperature and high-humidity environment for a long period of time and a greater effect of suppressing the excessive charge of the toner in a low-temperature and low-humidity environment are obtained. S3/A can be controlled by the selection of the silicon compound and the mixing ratio of the silicon compound.

(a)

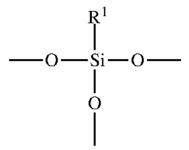

In the chart obtained by $^{29}$Si-NMR measurement of the fine particles, where the total peak area corresponding to the silicon polymer is denoted by A, the peak area corresponding to the structure represented by the following formula (b) is denoted by S4, and the peak area corresponding to the structure represented by the following formula (c) is denoted by S2, it is preferable that the A, S2 and S4 satisfy the following formulas (2) and (3).

$$0.20 \leq S4/A \leq 0.50 \quad (2)$$

$$0.40 \leq S2/A \leq 0.70 \quad (3)$$

Further, it is more preferable that 0.30≤S4/A≤0.46. It is more preferable that 0.54≤S2/A≤0.70. $R^2$ and $R^3$ each independently represent an alkyl group having 1 to 6 carbon atoms.

By satisfying the formulas (2) and (3), a greater effect of suppressing the decrease in the charge quantity of the toner in a high-temperature and high-humidity environment for a long period of time and a greater effect of suppressing the excessive charge of the toner in a low-temperature and low-humidity environment are obtained. S4/A and S2/A can be controlled by the selection of the silicon compound and the mixing ratio of the silicon compound.

(b)

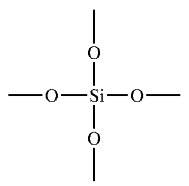

(c)

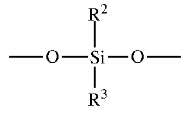

Fine particles can be used as an external additive for toner. That is, it is preferable that the external additive for toner includes the above fine particles. The toner preferably has toner particles and an external additive for toner, the toner particle includes a binder resin, and the external additive for toner is the fine particles. The amount of the external additive for toner in the toner is preferably 0.1 part by mass to 20.0 parts by mass, and more preferably 0.5 part by mass to 10.0 parts by mass with respect to 100 parts by mass of the toner particles.

Where the content of the external additive for toner is 0.1 parts by mass or more, even when a large amount of images with a low print density are output for a long time in a harsh environment such as a high-temperature and high-humidity environment, stress applied to toner can be suppressed, and durability stability and charge stability are improved. Further, when the content of the external additive for toner is 20.0 parts by mass or less, even when an image having a high print density is output for a long time, filming of the external additive particles on the carrier or the photosensitive member can be suppressed.

The fixing ratio of the external additive for toner to toner particles when the toner is dispersed in an aqueous medium including a surfactant and sucrose, shaken with a shaker, and then centrifuged (fixing ratio of the external additive for toner determined by water washing method) is preferably 20% or more, and more preferably 30% or more. The upper limit of the fixing ratio is not particularly limited, but is preferably 60% or less, and more preferably 50% or less.

Where the fixing ratio of the external additive for toner is within the above range, even when a large amount of images with low print density are output in a harsh environment such as a high-temperature and high-humidity environment for a long period of time, the durability stability and charge stability are further improved since the external additive for toner is unlikely to come off from the toner. Further, even when printing is performed for a long period of time in an environment where the toner is excessively charged, such as a low-temperature and low-humidity environment, the external additive for toner is unlikely to separate from the toner, so that a greater effect of suppressing the excessive charge of the toner can be obtained. The fixing ratio of the external additive for toner can be controlled by the toner production method. For example, a method of heat-treating after mixing the external additive for toner with the toner particles can be mentioned.

Binder Resin

The binder resin used in the toner is not particularly limited, and for instance the following polymers can be used. For example monopolymers of styrene and substituted styrene, such as polystyrene, poly-p-chlorostyrene and polyvinyltoluene; styrene copolymers such as styrene-p-chlorostyrene copolymer, styrene-vinyltoluene copolymer, styrene-vinylnaphthalene copolymer, styrene-acrylate ester copolymers, styrene-methacrylate ester copolymers, styrene-$\alpha$-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinylbutyral resin, terpene resin, coumarone-indene resin and petroleum-based resin may be used. Preferred among the foregoing are polyester resins, from the viewpoint of durability stability and charging stability.

Colorant

A colorant may be used in the toner particle. The colorant may also be contained in the toner particle. The following are examples of colorants. Examples of black colorants include carbon black, and blacks obtained by color adjustment of blending yellow, magenta and cyan colorants. A pigment may be used alone as the colorant, but from the standpoint of image quality with full-color images, preferably a dye and a pigment are used together to improve the color clarity.

Examples of magenta pigments include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of magenta dyes include C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39 and 40 and C.I. Basic Violet 1, 3, 7, 10, 14, 15, 21, 25, 26, 27 and 28.

Examples of cyan pigments include C.I. Pigment Blue 2, 3, 15:2, 15:3, 15:4, 16 and 17; C.I. Vat Blue 6; C.I. Acid Blue 45, and copper phthalocyanine pigments having 1 to 5 phthalimidomethyl groups substituted on a phthalocyanine skeleton. Examples of cyan dyes include C.I. Solvent Blue 70.

Examples of yellow pigments include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3, and 20. Examples of yellow dyes include C.I. Solvent Yellow 162. The content of the colorant is preferably from 0.1 to 30 mass parts per 100 mass parts of the binder resin.

Wax

Wax may be used in the toner particle. Examples of waxes include the following. Examples of the wax include the following: hydrocarbon waxes such as low molecular weight polyethylene, low molecular weight polypropylene, alkylene copolymer, microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax.

Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylenebis stearamide, ethylenebis capramide, ethylenebis lauramide and hexamethylenebis stearamide; unsaturated fatty acid amides such as ethylenebis oleamide, hexamethylenebis oleamide, N,N'-dioleyladipamide and N,N'-dioleylsebacamide; aromatic bisamides such as m-xylenebis stearamide and N,N'-distearylisophthalamide; fatty acid metal salts (commonly called metal soaps) such as calcium stearate, calcium laurate, zinc stearate and magnesium stearate; aliphatic hydrocarbon waxes grafted with vinyl monomers such as styrene or acrylic acid; partially esterified products of fatty acids and polyvalent alcohols, such as behenic acid monoglyceride; and methyl ester compounds with hydroxyl groups obtained by hydrogenation of plant-based oils and fats. The content of the wax is preferably from 2.0 parts by mass to 30.0 parts by mass, relative to 100 parts by mass of the binder resin.

Charge Control Agent

The toner particle may comprise a charge control agent as necessary. A known charge control agent may be used, but a metal compound of an aromatic carboxylic acid is especially desirable because it is colorless and yields a toner particle that has a rapid charging speed and can stably maintain a fixed charge quantity.

Examples of negatively-charging charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes.

Examples of the positive charge control agent include a quaternary ammonium salt, a polymer compound having the quaternary ammonium salt in a side chain, a guanidine compound, and an imidazole compound. The charge control agent may be added internally or externally to the toner particle. The amount of the charge control agent added is preferably from 0.2 parts by mass to 10 parts by mass with respect to 100 parts by mass of the binder resin.

Inorganic Fine Particles

The toner may include, if necessary, other inorganic fine particles in addition to the above-mentioned external additive for toner. The inorganic fine particles may be internally added to the toner particle, or may be mixed with the toner particle as an external additive. When contained as an external additive, inorganic fine particles such as silica fine particles, titanium oxide fine particles, and aluminum oxide fine particles are preferable. The inorganic fine particles are preferably hydrophobized with a hydrophobizing agent such as a silane compound, a silicone oil or a mixture thereof.

As the external additive for improving the flowability, inorganic fine particles having a specific surface area of from 50 $m^2/g$ to 400 $m^2/g$ or less are preferable. Inorganic fine particles having a specific surface area in the above range may be used in combination with an external additive for toner in order to achieve both improvement in flowability and stabilization of durability.

The inorganic fine particles are preferably used in an amount of from 0.1 parts by mass to 10.0 parts by mass with respect to 100 parts by mass of the toner particle. When the above range is satisfied, the effect of charge stability can be easily obtained. The content of the above-mentioned external additive for toner is preferably from 50% by mass to 100% by mass, more preferably from 80% by mass to 100% by mass, and still more preferably from 90% by mass to 100% by mass, based on the total amount of the external additive.

Developer

A toner can be used as a one-component developer, but it can also be mixed with a magnetic carrier and used as a two-component developer in order to further improve dot reproducibility and to supply a stable image for a long time.

That is, in a two-component developer containing a toner and a magnetic carrier, the toner is preferably the above-mentioned toner.

Generally well-known substances such as, for example, iron oxide, unoxidized iron powder; metal particles such as particles of iron, lithium, calcium, magnesium, nickel, copper, zinc, cobalt, manganese, chromium, and rare earths, particles of alloys thereof, and particles of oxides thereof; a magnetic substance such as a ferrite; a magnetic substance-dispersed resin carrier (so-called resin carrier) including the magnetic substance and a binder resin that holds the magnetic substance in a dispersed state can be used as the magnetic carrier. The mixing ratio of the magnetic carrier and the toner is preferably such that the toner concentration in the two-component developer is from 2% by mass to 15% by mass, and more preferably from 4% by mass to 13% by mass.

Method for Producing a Toner Particle and a Toner

The method for producing the toner particle is not particularly limited, and a known production method such as suspension polymerization, emulsification aggregation, melt-kneading or dissolution suspension can be resorted to.

Hereinafter, the toner production procedure by a pulverizing method will be described.

In the raw material mixing step, other components, for example, such as a binder resin, a release agent, a colorant, and if necessary, a charge control agent are weighed in predetermined amounts, compounded and mixed as materials constituting the toner particles. Examples of the mixing device include a double-cone mixer, a V-type mixer, a drum-type mixer, a super mixer, a Henschel mixer, a Nauta mixer, a mechano hybrid (manufactured by Nippon Coke Industries, Ltd.), and the like.

Next, the mixed material is melt-kneaded to disperse wax and the like in the binder resin. In the melt-kneading process, batch-type kneaders such as a pressurizing kneader, a Banbury mixer, and a continuous-type kneader can be used, and a single-screw or twin-screw extruder has become the mainstream because of the advantage of continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Iron Works Co., Ltd.), a twin-screw extruder (manufactured by KCK K.K.), a co-kneader (manufactured by Buss AG), Kneedex (manufactured by Nippon Coke Industries Co., Ltd.), and the like. Further, the resin composition obtained by melt-kneading may be rolled with two rolls or the like and cooled with water or the like in the cooling step.

Then, the cooled product of the resin composition is pulverized to a desired particle diameter in the pulverization step. In the pulverization step, after coarse pulverizing with a pulverizer such as a crusher, a hammer mill, or a feather mill, fine pulverizing is performed with, for example, a Cryptron system (manufactured by Kawasaki Heavy Industries, Ltd.), a super rotor (manufactured by Nisshin Engineering Co., Ltd.), a turbo mill (manufactured by Turbo Industries Co., Ltd.) or a fine pulverizer using an air jet method.

After that, if necessary, classification is performed using a classifier or a sieving machine such as Elbow Jet of an inertial classification system (manufactured by Nittetsu Mining Co., Ltd.), Turboplex of a centrifugal classification system (manufactured by Hosokawa Micron Corporation), TSP separator (manufactured by Hosokawa Micron Corporation), FACULTY (manufactured by Hosokawa Micron Corporation), and the like to obtain toner particles.

A toner can then be obtained by mixing the above toner external additive, and other external additives as needed, with the obtained toner particle. Mixing of the toner particle and the external additive can be accomplished using a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

In order to control the fixing ratio of the external additive for toner to the toner particles by the water washing method, it is preferable to mix the external additive for toner with the toner particles to obtain a toner particle mixture and then perform heat treatment. That is, it is preferable that a method for producing the toner include a mixing step of mixing the toner particles and an external additive for toner to obtain a toner particle mixture, and a heat treatment step of heat-treating the toner particle mixture. For example, the heat treatment can be performed by hot air using a heat treatment apparatus shown in the FIGURE.

The reference numerals in the FIGURE are as follows. 1. Raw material quantitative supply means, 2. Compressed gas flow rate adjusting means, 3. Introducing tube, 4. Protruding member, 5. Supply pipe, 6. Treatment chamber, 7. Hot air supply means, 8. Cold air supply means, 9. Regulating means, 10. Collecting means, 11. Hot air supply means outlet, 12. Distributing member, 13. Swirling member, 14. Powder particle supply port.

The heat treatment apparatus has the treatment chamber 6 for heat-treating the toner particle mixture, the toner particle mixture supply means for supplying the toner particle mixture to the treatment chamber 6, the hot air supply means 7 for supplying hot air for heat treating the toner particle mixture supplied from the toner particle mixture supply means, and the collecting means 10 for discharging the heat-treated toner particles from the discharge port provided in the treatment chamber 6 to the outside of the treatment chamber 6 and collecting the discharged particles.

The heat treatment apparatus shown in the FIGURE further has a regulating means 9 as a cylindrical member, and the treatment chamber 6 has a cylindrical shape that covers the outer peripheral surface of the regulating means 9. The hot air supply means 7 is provided on one end side of the cylindrical shape of the treatment chamber 6 so that the hot air flows while rotating in the treatment chamber 6 having the cylindrical shape. Further, the toner particle supply means is composed of a plurality of supply pipes 5 provided on the outer periphery of the treatment chamber 6.

Further, the discharge port provided in the treatment chamber 6 is provided so as to be present on the outer periphery of the end portion of the treatment chamber 6 on the side opposite to the side where the hot air supply means 7 is provided, on an extension line in the rotation direction of the toner particle mixture. The heat treatment using the heat treatment apparatus having the above structure will be described below.

The toner particle mixture quantitatively supplied by the raw material quantitative supply means 1 is guided by the compressed gas adjusted by the compressed gas flow rate adjusting means 2 to the introducing tube 3 installed on the vertical line of the raw material quantitative supply means 1. The mixture that has passed through the introducing tube is uniformly dispersed by the conical protruding member 4 provided in the central portion of the raw material quantitative supply means 1, and the mixture is guided to the supply pipes 5 in eight directions spreading radially and guided to the treatment chamber 6 where the heat treatment is performed.

At this time, the flow of the mixture supplied to the treatment chamber 6 is regulated by the regulating means 9 for regulating the flow of the mixture that is provided in the treatment chamber 6. Therefore, the mixture supplied to the treatment chamber is heat-treated while swirling in the treatment chamber 6, and then cooled.

The heat for heat-treating the supplied mixture is supplied from the hot air supply means 7, distributed by the distributing member 12, and introduced while being spirally swirled in the treatment chamber 6 by the swirling member 13 for swirling the hot air. A configuration can be used in which the swirling member 13 for swirling the hot air has a plurality of blades, and the swirling of the hot air is controlled by the number and the angle thereof. The hot air is supplied from the hot air supply means outlet 11.

The heat-treated toner particles are cooled by the cold air supplied from the cold air supply means 8 (cold air supply means 8-1, 8-2 and 8-3).

Next, the cooled toner particles are collected by the collecting means 10 at the lower end of the treatment chamber. A blower (not shown) is provided at the tip of the collecting means, and the toner particles are sucked and conveyed thereby.

Further, the powder particle supply port 14 is provided so that the swirling direction of the supplied mixture coincides with the swirling direction of the hot air, and the collecting means 10 of the thermal spheroidizing treatment apparatus is provided on the outer peripheral portion of the treatment chamber so as to maintain the swirling direction of the swirling powder particles. Further, the cold air supplied from the cold air supply means 8 is configured to be supplied horizontally and tangentially from the outer peripheral portion of the apparatus to the inner peripheral surface of the treatment chamber.

After obtaining the heat-treated toner particles, the heat-treated toner particles and various external additives may be mixed. Examples of suitable mixing devices include a double-cone mixer, a V-type mixer, a drum-type mixer, a super mixer, a Henschel mixer, a Nauta mixer, Mechano Hybrid (manufactured by Nippon Coke Industries Co., Ltd.), and Nobilta (manufactured by Hosokawa Micron Corporation).

The measurement methods for various physical properties will be explained below.

<Separation of External Additive Particles and Toner Particles from Toner>

It is also possible to measure each physical property by using the external additive separated from the toner by using the following method. A total of 200 g of sucrose (manufactured by Kishida Chemical Co., Ltd.) is added to 100 mL of ion-exchanged water and dissolved in a hot water bath to prepare a sucrose concentrate. A total of 31 g of the sucrose concentrate and 6 mL of Contaminone N (a 10% by mass aqueous solution of a neutral detergent for cleaning precision measuring instruments; has pH 7 and includes a nonionic surfactant, an anionic surfactant, and an organic builder; manufactured by Wako Pure Chemical Industries, Ltd.) are placed in a centrifuge tube to prepare a dispersion liquid. A total of 1 g of toner is added to the dispersion liquid, and the toner lumps are loosened with a spatula or the like.

The centrifuge tube is shaken with a shaker ("KM Shaker" (model: V.SX), manufactured by Iwaki Sangyo Co., Ltd.) for 20 min under the condition of 350 reciprocations per minute. After shaking, the solution is transferred to a glass tube for a swing rotor (50 mL), and centrifugation is performed at 3500 rpm for 30 min with a centrifuge.

In the glass tube after centrifugation, the toner is present in the uppermost layer, and the external additive for toner is present on the aqueous solution side of the lower layer. The aqueous solution of the lower layer is collected and centrifuged to separate the sucrose and the external additive for toner, and the external additive for toner is collected. If necessary, centrifugation is repeated, and after sufficient separation, the dispersion liquid is dried and an external additive for toner is collected. When a plurality of external additives for toner are added, the external additives for toner can be sorted by using a centrifugation method or the like.

Method for Measuring Water Adsorption Amount of Fine Particles

The amount of moisture adsorbed on the fine particles is measured by an adsorption equilibrium measuring device (BELSORP-aqua3: manufactured by Nippon Bell Co., Ltd.).

Degassing

It is necessary to degas the moisture adsorbed on the sample before measurement. A cell, a filler lot and a cap are attached, and weigh empty. A total of 0.4 g of a sample of fine particles is put into a weighing cell. The filler lot is placed in the cell, the cap is attached, and the cell is attached to the degassing port. After attaching all the cells to be measured to the degassing port, a helium valve is opened. A button of the port to be degassed is pushed ON, a "VAC" button is pushed, and degassing is performed for one day or more.

Measurement Method

The power of the main body of the measuring unit, the vacuum pump, the main body for circulating water, and the operation panel is turned on, and "BELaqua3.exe" (measurement software) is launched in the center of the PC screen. Temperature control of high-temperature air tank: "SV" in the frame of "TIC1" on the "Flow path diagram" window is double-clicked to open a "Temperature setting" window. The temperature (80° C.) is input, and the setting is clicked. Control of adsorption temperature: "SV" of "Adsorption temperature" in the "Flow path diagram" window is double-clicked, and the "SV value" (adsorption temperature) is inputted. "Start circulation" and "Outside temperature control" are clicked, and the setting is clicked. A "PURGE" button is pushed to stop degassing, the port button is turned OFF, the sample is detached, the cap is attached, the sample is weighed, and then the sample is attached to the measuring unit of the main body. The "Measurement conditions" is clicked on the PC to open the "Measurement condition settings" window. The measurement conditions are as follows.

Air thermostat temperature: 80.0° C.
Adsorption temperature: 30.0° C.
Adsorbent name: $H_2O$
Equilibrium time: 500 sec
Waiting time for temperature: 60 min
Saturated vapor pressure: 4.245 kPa
Sample tube exhaust speed: normal
Chemisorption measurement: not performed
Initial introduction amount: 0.20 $cm^3$ (STP)$\cdot g^{-1}$
Number of measured relative pressure ranges: 4

The number of samples to be measured is selected, the "Measurement data file name" and "Sample weight" are inputted, and the measurement is thereafter started.

Analysis

The analysis software provided with the measuring device is launched to perform analysis. The amount (mg/g) of moisture adsorbed at a temperature of 30° C. and a relative humidity of 80% is determined.

Method for Measuring Amount of Silanol Groups in Fine Particles Measured by Titration Method Using KOH The amount of silanol groups of the fine particles is measured by a method obtained by modifying a method of quantifying and calculating the silanol groups by titration based on a Sears method.

Preparation of Measurement Solution

A total of 2.0 g of fine particles and 25 g of ethanol are put in a 200 ml beaker, the beaker is shaken by hand, and the fine particles are wetted with ethanol. A total of 75 g of a 20% NaCl aqueous solution is added thereto, and the fine particles are dispersed for 1 min by ultrasonic dispersion.

Measurement

The fine particle-dispersed solution is stirred in a beaker with a stirrer. A 0.1 mol/L HCl aqueous solution is dropped with a micropipette and the pH is adjusted to 4.0. As a titration solution, a 0.1 mol/L KOH solution is added dropwise, and the amount of 0.1 mol/L KOH added dropwise by the time the pH reaches 9.0 is defined as the amount of silanol groups (mmol/g). Specifically, the amount of silanol groups per unit mass of fine particles is calculated by the following formula.

Amount of silanol groups (mmol/g)=[amount of dropped KOH (mmol)]/[2.0 (g)(amount of fine particles in the sample)]

<Method for Measuring Number-Average Particle Diameter of Primary Particles of Fine Particles>

The number-average particle diameter of primary particles of fine particles is measured in accordance with a centrifugal sedimentation method. Specifically, 0.01 g of dried fine particles are placed in a 25 ml glass vial, and 0.2 g of a 5% Triton solution and 19.8 g of RO water are added thereto, to produce a solution. Next, the probe (the tip within the leading end) of an ultrasonic disperser is immersed in that solution, to elicit ultrasonic dispersion at an output of 20 W for 15 minutes, and obtain a dispersion as a result. The number-average particle diameter of primary particles is measured next, using this dispersion, with the help of a centrifugal sedimentation particle size distribution measuring device DC24000 by CPS Instruments Inc. Disc rotational speed is set to 18000 rpm, and true density is set to 1.3 $g/cm^3$. Prior to measurement, the device is calibrated using polyvinyl chloride particles having an average particle diameter of 0.476 μm.

Method for Measuring BET Specific Surface Area of Fine Particles

The BET specific surface area of fine particles is measured by a gas adsorption method in which nitrogen gas is adsorbed on a sample surface according to a BET multipoint method using an automatic specific surface area/pore distribution measuring device Tristar 3000 (manufactured by Shimadzu Corporation). The measurement method follows the operation manual issued by the Shimadzu Corporation. First, 0.5 g of a sample is placed in a sample tube and evacuated at 100° C. for 24 hours. After evacuation is complete, the sample mass is precisely weighed to obtain a sample. From the obtained sample, the BET specific surface area can be obtained by using the automatic specific surface area/pore distribution measuring device. As the density value required for the measurement, the true density value measured by the dry densitometer Accupick 1330 (manufactured by Shimadzu Corporation) is used.

Method for Measuring Fixing Ratio of External Additive for Toner to Toner Particles by Washing Method Washing Step An aqueous solution of sucrose in which 20.7 g of sucrose (manufactured by Kishida Chemical Co., Ltd.) is dissolved in 10.3 g of ion-exchanged water and 6 mL of Contaminone N (a neutral detergent for cleaning precision measuring instruments which is composed of a nonionic surfactant, an anionic surfactant, and an organic builder and has a pH of 7), which is a surfactant, are placed in a 30 mL glass vial, and thoroughly mixed to prepare a dispersion liquid. As the glass vial, for example, VCV-30 manufactured by Nichiden Rika Glass Co., Ltd., outer diameter: 35 mm, height: 70 mm can be used.

A total of 1.0 g of toner is added to this dispersion liquid and allowed to stand until the toner naturally settles to prepare a pretreatment dispersion liquid. This pretreatment dispersion liquid is shaken with a shaker (YS-8D type: manufactured by Yayoi Co., Ltd.) at a shaking speed of 200 rpm for 5 min to remove the weakly adhered fine particles from the surface of the toner particles. A centrifuge is used to separate the toner in which the strongly adhered fine particles remain and the detached fine particles. The centrifuge step is performed at 3700 rpm for 30 min using a small desktop centrifuge H-19F (manufactured by Kokusan Co., Ltd.). The toner with residual fine particles is collected by suction filtration and dried to obtain toner washed with water.

Method for Measuring Fixing Ratio of Fine Particles

A method for measuring the fixing ratio of fine particles is described hereinbelow. First, the fine particles contained in the toner before the water washing treatment are quantified. The Si element intensity in the toner is measured using a wavelength dispersive fluorescent X-ray analyzer Axios advanced (manufactured by PANalytical). Next, the Si element intensity in the toner after the washing treatment is measured in the same manner. The fixing ratio (%) can be calculated by the following formula.

$$\text{Fixing ratio (\%)} = (\text{Intensity of Si element in toner after water washing treatment}) / (\text{Intensity of Si element in toner before water washing treatment}) \times 100$$

Method for Measuring Abundance Ratio of Constitutent Compounds, $S3/A$, $S4/A$ and $S2/A$ of Fine Particles by Solid $^{29}Si$-NMR In solid-state $^{29}$Si-NMR, peaks are detected in shift regions that differ depending on the structure of the functional group bonded to Si of the constituent compound of the fine particles. By specifying each peak position using a standard sample, the structure bonded to Si can be specified. Further, the abundance ratio of each constituent compound can be calculated from the obtained peak area. The ratio of the peak area of the M unit structure, the D unit structure, the T unit structure, and the Q unit structure to the total peak area can be obtained by calculation.

Specifically, the measurement conditions for solid-state $^{29}$Si-NMR are as follows.

Equipment: JNM-ECX5002 (JEOL RESONANCE)

Temperature: room temperature

Measurement method: DDMAS method $^{29}$Si 45°

Sample tube: zirconia, 3.2 mm in diameter

Sample: filled in powder form in the sample tube

Sample rotation speed: 10 kHz

Relaxation delay: 180 s

Scan: 2000

After the measurement, peaks are separated for the M unit structure, D unit structure, T unit structure, and Q unit structure by curve fitting a plurality of silane components having different substituents and bonding groups of the sample, and the area of each peak is calculated.

Curve fitting is performed using EXcalibur for Windows (registered trademark) version 4.2 (EX series), which is software for JNM-EX400 manufactured by JEOL Ltd. Measurement data are read by clicking "1D Pro" from a menu icon. Next, "Curve fitting function" is selected from "Command" on a menu bar, and curve fitting is performed. Curve fitting for each component is performed so that the difference (combined peak difference) between the combined peak obtained by combining the peaks obtained by curve fitting and the peak of the measurement result is the smallest.

| | |
|---|---|
| M unit structure: $(Ra)(Rb)(Rc)SiO_{1/2}$ | (S1') |
| D unit structure: $(Rd)(Re)Si(O_{1/2})_2$ | (S2') |
| T unit structure: $RfSi(O_{1/2})_3$ | (S3') |
| Q unit structure: $Si(O_{1/2})_4$ | (S4') |

The total peak area thereof corresponding to the silicon polymer is denoted by A. That is, (S1'+S2'+S3'+S4')=A.

Ra, Rb, Rc, Rd, Re and Rf in the formulas (S1'), (S2') and (S3') each represent an organic group such as hydrocarbon groups having 1 to 6 carbon atoms (for example, an alkyl group or an alkoxy group), a halogen atom, or a hydroxy group bonded to silicon. From the obtained peak areas, the peak area S3 corresponding to the structure represented by the formula (a), the peak area S4 corresponding to the structure represented by the formula (b), and the peak area S2 corresponding to the structure represented by the formula (c) are calculated. When it is necessary to confirm the structures in more detail, the measurement results of $^{13}$C-NMR and $^{1}$H-NMR may be identified together with the measurement results of $^{29}$Si-NMR. S3/A, S4/A and S2/A are calculated from A, S2, S3, and S4 thus obtained.

Method for Measuring Surface Treatment Agent for External Additive for Toner

The surface treatment agent for the external additive for toner is analyzed by pyrolysis-GC-MS (gas chromatography mass spectrometry). Specifically, the measurement conditions are as follows.

Apparatus: GC6890A (manufactured by Agilent Technologies, Inc.), pyrolyzer (manufactured by Nippon Analytical Industry Co., Ltd.)

Column: HP-5 ms 30 m

Pyrolysis temperature: 590° C.

The surface treatment agent for the external additive for toner is specified by using a standard sample to specify each peak position of the profile obtained by measurement.

Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51"

(Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used. The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50000.

(7) The measurement data is analyzed by the dedicated software provided with the instrument and the weight-average particle diameter (D4) is calculated. When set to graph/volume % with the dedicated software, the "average diameter" on the analysis/volume statistical value (arithmetic average) screen is the weight-average particle diameter (D4).

EXAMPLES

The present invention will be described in more concrete terms with reference to the examples illustrated below. However, these examples are not meant to limit the present invention in any way. Unless otherwise stated, the language "parts" in the formulations below refers to parts by mass in all instances.

Production Example of External Additive Particles 1 for Toner

1. Hydrolysis Step

A total of 43.2 g of RO water and 0.008 g of acetic acid as a catalyst were put in a 200 ml beaker and stirred at 45° C. To this, 27.2 g of tetraethoxysilane and 27.2 g of dimethyldimethoxysilane were added, followed by stirring for 1.5 h to obtain a raw material solution.

2. Polycondensation Step

A total of 68.8 g of RO water, 340.0 g of methanol, and 2.0 g of 25% ammonia water were put into a 1000 ml beaker and stirred at 30° C. to prepare an alkaline aqueous medium. The raw material solution obtained in "1. Hydrolysis step" was added dropwise over 1 min to this alkaline aqueous medium. The mixed solution after the dropwise addition of the raw material solution was stirred as it was at 30° C. for 1.5 h to advance the polycondensation reaction and obtain a polycondensation reaction solution.

3. Particle Formation Step

A total of 1000 g of RO water was put in a 2000 ml beaker followed by stirring at 25° C. The polycondensation reaction solution obtained in "2. Polycondensation step" was added dropwise over 10 min. As soon as the polycondensation reaction liquid was mixed with water, it became cloudy, and a dispersion liquid including silicon polymer particles having a siloxane bond was obtained.

4. Hydrophobization Step

A total of 27.1 g of hexamethyldisilazane as a hydrophobizing agent was added to the dispersion liquid including silicon polymer particles having a siloxane bond that was obtained in "3. Particle formation step", followed by stirring at 60° C. for 2.5 h. After the dispersion liquid was allowed to stand for 5 min, the powder precipitated in the lower part of the solution was collected by suction filtration and dried under reduced pressure at 120° C. for 24 h to obtain external additive particles 1 for toner. The number-average particle diameter of primary particles of the obtained external additive particles 1 for toner was 0.12 μm. Table 1 shows the physical characteristics of the external additive particles 1 for toner.

Production Example of External Additive Particles 2 for Toner

External additive particles 2 for toner were obtained in the same manner as in the production example of external additive particles 1 for toner, except that in the hydrolysis step, the amount of tetraethoxysilane was changed to 22.0 g, the amount of dimethyldimethoxysilane was changed to 32.4 g, the stirring temperature was changed to 40° C., and the amount of 25% ammonia water used in the polycondensation step was changed to 2.2 g. Table 1 shows the physical characteristics of the obtained external additive particles 2 for toner.

Production Example of External Additive Particles 3 for Toner

External additive particles 3 for toner were obtained in the same manner as in the production example of external additive particles 1 for toner, except that in the hydrolysis step, the amount of tetraethoxysilane was changed to 33.8 g, the amount of dimethyldimethoxysilane was changed to 20.6 g, the stirring temperature was changed to 50° C., and the amount of 25% ammonia water used in the polycondensation step was changed to 1.8 g. Table 1 shows the physical characteristics of the obtained external additive particles 3 for toner.

Production Example of External Additive Particles 4 for Toner

External additive particles 4 for toner were obtained in the same manner as in the production example of external additive particles 3 for toner, except that in the hydrolysis step, the amount of tetraethoxysilane was changed to 14.6 g, the amount of dimethyldimethoxysilane was changed to 30.3 g, and 4.1 g of trimethoxymethylsilane was further added. Table 1 shows the physical characteristics of the obtained external additive particles 4 for toner.

Production Example of External Additive Particles 5 for Toner

External additive particles 5 for toner were obtained in the same manner as in the production example of external additive particles 3 for toner, except that in the hydrolysis step, the amount of tetraethoxysilane was changed to 21.2 g, the amount of dimethyldimethoxysilane was changed to 17.3 g, and 4.1 g of trimethoxymethylsilane and 11.2 g of triethylmethoxysilane were further added. Table 1 shows the physical characteristics of the obtained external additive particles 5 for toner.

Production Example of External Additive Particles 6 for Toner

External additive particles 6 for toner were obtained in the same manner as in the production example of external additive particles 3 for toner, except that in the hydrolysis step, the amount of tetraethoxysilane was changed to 36.7 g, the amount of dimethyldimethoxysilane was changed to 17.3 g, and 5.4 g triethylmethoxysilane was further added. Table 1 shows the physical characteristics of the obtained external additive particles 6 for toner.

Production Example of External Additive Particles 7 for Toner

External additive particles 7 for toner were obtained in the same manner as in the production example of external additive particles 3 for toner, except that in the hydrolysis step, the amount of tetraethoxysilane was changed to 13.9 g, the amount of dimethyldimethoxysilane was changed to 22.9 g, and 4.1 g of trimethoxymethylsilane and 11.2 g of triethylmethoxysilane were further added. Table 1 shows the physical characteristics of the obtained external additive particles 7 for toner.

Production Example of External Additive Particles 8 for Toner

External additive particles 8 for toner were obtained in the same manner as in the production example of external additive particles 3 for toner, except that in the hydrolysis step, the amount of tetraethoxysilane was changed to 37.4 g and the amount of dimethyldimethoxysilane was changed to 21.2 g. Table 1 shows the physical characteristics of the obtained external additive particles 8 for toner.

Production Example of External Additive Particles 9 for Toner

External additive particles 9 for toner were obtained in the same manner as in the production example of external additive particles 3 for toner, except that in the hydrolysis step, the amount of tetraethoxysilane was changed to 13.9 g, the amount of dimethyldimethoxysilane was changed to 30.7 g, and 4.1 g of trimethoxymethylsilane was further added. Table 1 shows the physical characteristics of the obtained external additive particles 9 for toner.

Production Example of External Additive Particles 10 for Toner

External additive particles 10 for toner were obtained in the same manner as in the production example of external additive particles 3 for toner, except that in the hydrolysis step, the amount of tetraethoxysilane was changed to 13.9 g, the amount of dimethyldimethoxysilane was changed to 16.9 g, and 4.1 g of trimethoxymethylsilane and 17.1 g of triethylmethoxysilane were further added. Table 1 shows the physical characteristics of the obtained external additive particles 10 for toner.

Production Example of External Additive Particles 11 for Toner

External additive particles 11 for toner were obtained in the same manner as in the production example of external additive particles 3 for toner, except that in the hydrolysis step, the amount of tetraethoxysilane was changed to 14.6 g, the amount of dimethyldimethoxysilane was changed to 16.9 g, and 9.9 g of trimethoxymethylsilane and 11.8 g of triethylmethoxysilane were further added. Table 1 shows the physical characteristics of the obtained external additive particles 11 for toner.

Production Example of External Additive Particles 12 for Toner

External additive particles 12 for toner were obtained in the same manner as in the production example of external additive particles 3 for toner, except that in the hydrolysis step, the amount of tetraethoxysilane was changed to 13.9 g, the amount of dimethyldimethoxysilane was changed to 16.9 g, and 21.5 g of trimethoxymethylsilane and 1.1 g of triethylmethoxysilane were further added. Table 1 shows the physical characteristics of the obtained external additive particles 12 for toner.

Production Example of External Additive Particles 13 for Toner

External additive particles 13 for toner were obtained in the same manner as in the production example of external additive particles 3 for toner, except that in the hydrolysis step, the amount of tetraethoxysilane was changed to 13.9 g, the amount of dimethyldimethoxysilane was changed to 16.9 g, and 22.0 g of trimethoxymethylsilane and 0.5 g of triethylmethoxysilane were further added. Table 1 shows the physical characteristics of the obtained external additive particles 13 for toner.

Production Example of External Additive Particles 14 for Toner

External additive particles 14 for toner were obtained in the same manner as in the production example of external additive particles 13 for toner, except that in the hydrophobization step, the hydrophobizing agent used was changed to octamethylcyclotetrasiloxane. Table 1 shows the physical characteristics of the obtained external additive particles 14 for toner.

Production Example of External Additive Particles 15 for Toner

External additive particles 15 for toner were obtained in the same manner as in the production example of external additive particles 13 for toner, except that in the hydrophobization step, the hydrophobizing agent used was changed to chlorotrimethylsilane. Table 1 shows the physical characteristics of the obtained external additive particles 15 for toner.

Production Example of External Additive Particles 16 for Toner

External additive particles 16 for toner were obtained in the same manner as in the production example of external additive particles 13 for toner, except that in the hydrophobization step, the hydrophobizing agent used was changed to trifluoropropyltrimethoxysilane. Table 1 shows the physical characteristics of the obtained external additive particles 16 for toner.

Production Example of External Additive Particles 17 for Toner

External additive particles 17 for toner were obtained in the same manner as in the production example of external additive particles 13 for toner, except that in the hydrophobization step, the hydrophobizing agent used was changed to dimethyl silicone oil. Table 1 shows the physical characteristics of the obtained external additive particles 17 for toner.

Production Example of External Additive Particles 18 for Toner

External additive particles 18 for toner were obtained in the same manner as in the production example of external additive particles 13 for toner, except that in the hydrophobization step, no hydrophobizing agent was used. Table 1 shows the physical characteristics of the obtained external additive particles 18 for toner.

Production Example of External Additive Particles 19 for Toner

External additive particles 19 for toner were obtained in the same manner as in the production example of external additive particles 18 for toner, except that in the hydrolysis step, the stirring temperature was changed to 40° C., and the amount of 25% ammonia water used in the polycondensation step was changed to 2.3 g. Table 1 shows the physical characteristics of the obtained external additive particles 19 for toner.

Production Example of External Additive Particles 20 for Toner

External additive particles 20 for toner were obtained in the same manner as in the production example of external additive particles 18 for toner, except that in the hydrolysis step, the stirring temperature was changed to 50° C., and the amount of 25% ammonia water used in the polycondensation step was changed to 1.3 g. Table 1 shows the physical characteristics of the obtained external additive particles 20 for toner.

Production Example of External Additive Particles 21 for Toner

External additive particles 21 for toner were obtained in the same manner as in the production example of external additive particles 19 for toner, except that the amount of 25% ammonia water used in the polycondensation step was changed to 2.4 g. Table 1 shows the physical characteristics of the obtained external additive particles 21 for toner.

Production Example of External Additive Particles 22 for Toner

External additive particles 22 for toner were obtained in the same manner as in the production example of external additive particles 20 for toner, except that the amount of 25% ammonia water used in the polycondensation step was changed to 1.2 g. Table 1 shows the physical characteristics of the obtained external additive particles 22 for toner.

Production Example of External Additive Particles 23 for Toner

External additive particles 23 for toner were obtained in the same manner as in the production example of external additive particles 20 for toner, except that the amount of 25% ammonia water used in the polycondensation step was changed to 1.0 g. Table 1 shows the physical characteristics of the obtained external additive particles 23 for toner.

Production Example of External Additive Particles 24 for Toner

External additive particles 24 for toner were obtained in the same manner as in the production example of external additive particles 19 for toner, except that the amount of 25% ammonia water used in the polycondensation step was changed to 3.0 g. Table 1 shows the physical characteristics of the obtained external additive particles 24 for toner.

Production Example of External Additive Particles 25 for Toner

External additive particles 25 for toner were obtained in the same manner as in the production example of external additive particles 24 for toner, except that in the hydrolysis step, the amount of tetraethoxysilane was changed to 13.9 g, the amount of dimethyldimethoxysilane was changed to 13.0 g, 27.8 g of trimethoxymethylsilane was further added, and triethylmethoxysilane was not added. Table 1 shows the physical characteristics of the obtained external additive particles 25 for toner.

Production Example of External Additive Particles 26 for Toner

External additive particles 26 for toner were obtained in the same manner as in the production example of external additive particles 25 for toner, except that in the hydrolysis step, the amount of tetraethoxysilane was changed to 13.9 g, the amount of dimethyldimethoxysilane was changed to 8.6 g, and 33.6 g of trimethoxymethylsilane was further added. Table 1 shows the physical characteristics of the obtained external additive particles 26 for toner.

Production Example of External Additive Particles 27 for Toner

External additive particles 27 for toner were obtained in the same manner as in the production example of external additive particles 26 for toner, except that in the polycondensation step, the stirring temperature was changed to 23° C. Table 1 shows the physical characteristics of the obtained external additive particles 27 for toner.

Production Example of External Additive Particles 28 for Toner

External additive particles 28 for toner were obtained in the same manner as in the production example of external additive particles 1 for toner, except that in the hydrolysis step, tetraethoxysilane and dimethyldimethoxysilane were not used, 54.4 g of trimethoxymethylsilane was added thereinstead, the stirring temperature was changed to 30° C. and the stirring time was changed to 0.5 hours. Table 1 shows the physical characteristics of the obtained external additive particles 28 for toner.

Production Example of External Additive Particles 29 for Toner

External additive particles 29 for toner were obtained in the same manner as in the production example of external additive particles 28 for toner, except that in the hydrophobization step, no hydrophobizing agent was used. Table 1 shows the physical characteristics of the obtained external additive particles 29 for toner.

Production Example of External Additive Particles 30 for Toner

In a 2000 ml beaker, 124.0 g of ethanol, 24.0 g of RO water, and 10.0 g of 28% ammonia water were added, the solution was adjusted to 70° C., and 232.0 g of tetraethoxysilane and 84.0 g of 5.4% ammonia water were added dropwise over 0.5 hours under stirring. After the dropping was completed, stirring was continued for 0.5 hours and hydrolysis was performed to obtain a dispersion liquid of silicon polymer particles having siloxane bonds.

After adding 95.0 g of hexamethyldisilazane at room temperature to the dispersion liquid of silicon polymer particles having siloxane bonds, which was obtained in the above step, the dispersion liquid was heated to 50° C. to 60° C. and stirred for 3.0 hours, and the powder in the dispersion liquid was collected by suction filtration and dried under reduced pressure at 120° C. for 24 hours to obtain external additive particles 30 for toner. Table 1 shows the physical characteristics of the obtained external additive particles 30 for toner.

Production Example of External Additive Particles 31 for Toner

External additive particles 31 for toner were obtained in the same manner as in the production example of external additive particles 30 for toner, except that the amount of tetraethoxysilane was changed to 208.8 g and 23.2 g of trimethoxymethylsilane was added. Table 1 shows the physical characteristics of the obtained external additive particles 31 for toner.

Production Example of External Additive Particles 32 for Toner

External additive particles 32 for toner were obtained in the same manner as in the production example of external additive particles 1 for toner, except that in the hydrolysis step, 7.3 g of tetraethoxysilane, 21.6 g of dimethyldimethoxysilane, and 21.5 g of trimethoxymethylsilane were added, the stirring temperature was changed to 30° C. and the stirring time was changed to 0.5 hours. Table 1 shows the physical characteristics of the obtained external additive particles 32 for toner.

Production Example of External Additive Particles 33 for Toner

External additive particles 33 for toner were obtained in the same manner as in the production example of external additive particles 1 for toner, except that in the hydrolysis step, 29.3 g of tetraethoxysilane, 4.3 g of dimethyldimethoxysilane, and 27.2 g of trimethoxymethylsilane were added, the stirring temperature was changed to 30° C. and the stirring time was changed to 0.5 hours. Table 1 shows the physical characteristics of the obtained external additive particles 33 for toner.

Production Example of External Additive Particles 34 for Toner

External additive particles 34 for toner were obtained in the same manner as in the production example of external additive particles 20 for toner, except that the amount of 25% ammonia water used in the polycondensation step was changed to 0.9 g. Table 1 shows the physical characteristics of the obtained external additive particles 34 for toner.

Production Example of External Additive Particles 35 for Toner

External additive particles 35 for toner were obtained in the same manner as in the production example of external additive particles 27 for toner, except that the amount of 25% ammonia water used in the polycondensation step was changed to 3.2 g. Table 1 shows the physical characteristics of the obtained external additive particles 35 for toner.

TABLE 1

| External additive particle for toner No. | Monomer composition mol % Q Unit | T Unit | D Unit | M Unit | MA mg/g | SiOH amount mmol/g | PD µm | BET $m^2/g$ | Surface treatment Compound | $^{29}$Si-NMR S3/A | S2/A | S4/A |
|---|---|---|---|---|---|---|---|---|---|---|---|---|
| 1 | 37 | 0 | 63 | 0 | 7.0 | 0.017 | 0.12 | 100 | Hexamethyldisilazane | 0.00 | 0.63 | 0.37 |
| 2 | 30 | 0 | 70 | 0 | 4.7 | 0.015 | 0.18 | 50 | Hexamethyldisilazane | 0.00 | 0.70 | 0.30 |
| 3 | 46 | 0 | 54 | 0 | 8.8 | 0.040 | 0.08 | 150 | Hexamethyldisilazane | 0.00 | 0.54 | 0.46 |
| 4 | 20 | 10 | 70 | 0 | 4.0 | 0.013 | 0.08 | 150 | Hexamethyldisilazane | 0.10 | 0.70 | 0.20 |
| 5 | 29 | 10 | 40 | 21 | 6.2 | 0.014 | 0.08 | 150 | Hexamethyldisilazane | 0.10 | 0.40 | 0.29 |
| 6 | 50 | 0 | 40 | 10 | 9.0 | 0.042 | 0.08 | 150 | Hexamethyldisilazane | 0.00 | 0.40 | 0.50 |
| 7 | 19 | 10 | 53 | 18 | 3.2 | 0.012 | 0.08 | 150 | Hexamethyldisilazane | 0.10 | 0.53 | 0.19 |
| 8 | 51 | 0 | 49 | 0 | 11.0 | 0.045 | 0.08 | 150 | Hexamethyldisilazane | 0.00 | 0.49 | 0.51 |
| 9 | 19 | 10 | 71 | 0 | 3.9 | 0.012 | 0.08 | 150 | Hexamethyldisilazane | 0.10 | 0.71 | 0.19 |
| 10 | 19 | 10 | 39 | 32 | 6.7 | 0.012 | 0.08 | 150 | Hexamethyldisilazane | 0.10 | 0.39 | 0.19 |
| 11 | 19 | 20 | 39 | 22 | 8.0 | 0.012 | 0.08 | 150 | Hexamethyldisilazane | 0.20 | 0.39 | 0.19 |
| 12 | 19 | 40 | 39 | 2 | 10.0 | 0.012 | 0.08 | 150 | Hexamethyldisilazane | 0.40 | 0.39 | 0.19 |
| 13 | 19 | 41 | 39 | 1 | 10.2 | 0.012 | 0.08 | 150 | Hexamethyldisilazane | 0.41 | 0.39 | 0.19 |
| 14 | 19 | 41 | 39 | 1 | 10.6 | 0.012 | 0.08 | 150 | D4 | 0.41 | 0.39 | 0.19 |
| 15 | 19 | 41 | 39 | 1 | 10.8 | 0.012 | 0.08 | 150 | Chlorosilane | 0.41 | 0.39 | 0.19 |
| 16 | 19 | 41 | 39 | 1 | 10.9 | 0.012 | 0.08 | 150 | Fluorosilane | 0.41 | 0.39 | 0.19 |
| 17 | 19 | 41 | 39 | 1 | 10.9 | 0.012 | 0.08 | 150 | Silicone oil | 0.41 | 0.39 | 0.19 |
| 18 | 19 | 41 | 39 | 1 | 12.0 | 0.034 | 0.08 | 150 | None | 0.41 | 0.39 | 0.19 |
| 19 | 19 | 41 | 39 | 1 | 12.0 | 0.034 | 0.18 | 30 | None | 0.41 | 0.39 | 0.19 |
| 20 | 19 | 41 | 39 | 1 | 12.0 | 0.034 | 0.08 | 250 | None | 0.41 | 0.39 | 0.19 |
| 21 | 19 | 41 | 39 | 1 | 12.0 | 0.034 | 0.18 | 25 | None | 0.41 | 0.39 | 0.19 |
| 22 | 19 | 41 | 39 | 1 | 12.0 | 0.034 | 0.08 | 260 | None | 0.41 | 0.39 | 0.19 |
| 23 | 19 | 41 | 39 | 1 | 12.0 | 0.034 | 0.05 | 270 | None | 0.41 | 0.39 | 0.19 |
| 24 | 19 | 41 | 39 | 1 | 12.0 | 0.034 | 0.30 | 25 | None | 0.41 | 0.39 | 0.19 |
| 25 | 19 | 51 | 30 | 0 | 15.0 | 0.034 | 0.30 | 25 | None | 0.51 | 0.30 | 0.19 |
| 26 | 19 | 61 | 20 | 0 | 22.0 | 0.080 | 0.30 | 25 | None | 0.61 | 0.20 | 0.19 |
| 27 | 19 | 61 | 20 | 0 | 22.0 | 0.100 | 0.30 | 25 | None | 0.61 | 0.20 | 0.19 |
| 28 | 0 | 100 | 0 | 0 | 16.0 | 0.011 | 0.11 | 200 | Hexamethyldisilazane | 1.00 | 0.00 | 0.00 |
| 29 | 0 | 100 | 0 | 0 | 23.0 | 0.050 | 0.11 | 200 | None | 1.00 | 0.00 | 0.00 |
| 30 | 100 | 0 | 0 | 0 | 100.0 | 0.835 | 0.11 | 25 | Hexamethyldisilazane | 0.00 | 0.00 | 1.00 |
| 31 | 90 | 10 | 0 | 0 | 90.0 | 0.800 | 0.11 | 24 | Hexamethyldisilazane | 0.10 | 0.00 | 0.90 |
| 32 | 10 | 40 | 50 | 0 | 8.0 | 0.010 | 0.11 | 175 | None | 0.40 | 0.50 | 0.10 |
| 33 | 40 | 50 | 10 | 0 | 42.0 | 0.050 | 0.11 | 155 | Hexamethyldisilazane | 0.50 | 0.10 | 0.40 |
| 34 | 19 | 41 | 39 | 1 | 12.0 | 0.034 | 0.04 | 280 | None | 0.41 | 0.39 | 0.19 |
| 35 | 19 | 61 | 20 | 0 | 22.0 | 0.100 | 0.31 | 25 | None | 0.61 | 0.20 | 0.19 |

In the table, "MA" indicates "Moisture adsorption amount", "SiOH amount" indicates the amount of silanol groups per 1 g of fine particles, "PD" indicates the number average particle diameter of the primary particles, and " BET" indicates the BET specific surface area. Further, D4 indicates octamethylcyclotetrasiloxane, chlorosilane indicates chlorotrimethylsilane, fluorosilane indicates trifluoropropyltrimethoxysilane, and silicone oil indicates dimethyl silicone oil.

Production Example of Polyester Resin A1

| | |
|---|---|
| Polyoxypropylene(2.2)-2,2-bis(4-hydroxyphenyl)propane | 76.9 parts (0.167 mol parts) |
| Terephthalic acid (TPA) | 25.0 parts (0.145 mol parts) |
| Adipic acid | 8.0 parts (0.054 mol parts) |
| Titanium tetrabutoxide | 0.5 parts |

The above materials were placed in a 4-liter glass four-necked flask, a thermometer, a stirring rod, a condenser and a nitrogen introduction tube were attached to the flask, and the flask with the attachments was placed in a mantle heater. Next, the inside of the flask was replaced with nitrogen gas, the temperature was gradually raised while stirring, and the reaction was carried out for 4 h while stirring at a temperature of 200° C. (first reaction step). After that, 1.2 parts (0.006 mol parts) of trimellitic anhydride (TMA) was added and reacted at 180° C. for 1 h (second reaction step) to obtain a polyester resin A1.

Production Example of Polyester Resin A2

| | |
|---|---|
| Polyoxypropylene(2.2)-2,2-bis(4-hydroxyphenyl)propane | 71.3 parts (0.155 mol parts) |
| Terephthalic acid | 24.1 parts (0.145 mol parts) |
| Titanium tetrabutoxide | 0.6 parts |

The above materials were placed in a 4-liter glass four-necked flask, a thermometer, a stirring rod, a condenser and a nitrogen introduction tube were attached to the flask, and the flask with the attachments was placed in a mantle heater. Next, the inside of the flask was replaced with nitrogen gas, the temperature was gradually raised while stirring, and the reaction was carried out for 2 h while stirring at a temperature of 200° C. After that, 5.8 parts (0.030 mol parts) of trimellitic anhydride was added and reacted at 180° C. for 10 h to obtain a polyester resin A2.

Production Example of Toner Particle 1

| | |
|---|---|
| Polyester Resin A1 | 70.0 parts |
| Polyester Resin A2 | 30.0 parts |

-continued

| | |
|---|---|
| Fischer-Tropsch wax (peak temperature of 78° C. of maximum endothermic peak) | 5.0 parts |
| C.I. Pigment blue 15:3 | 5.0 parts |
| Aluminum 3,5-di-t-butyl salicylate compound | 0.1 part |

The starting materials in the above formulation were mixed using a Henschel mixer (FM-75 model, by Nippon Coke & Engineering Co., Ltd.) at a rotational speed of 20 $s^{-1}$ and for a rotation time of 5 min, followed by kneading using a twin-screw kneader (PCM-30 model, by Ikegai Corp.) set to a temperature of 125° C. and a rotational speed of 300 rpm. The obtained kneaded product was cooled and coarsely pulverized with a hammer mill to a diameter of 1 mm or less, to obtain a coarsely pulverized product. The obtained coarsely pulverized product was finely pulverized using a mechanical crusher (T-250, by Freund Turbo Corporation).

Further, a rotary classifier (200 TSP, by Hosokawa Micron Corporation) was used for classification, to obtain Toner particle 1. The operating conditions of the rotary classifier (200 TSP, by Hosokawa Micron Corporation) involved herein classification performed at a rotational speed of 50.0 $s^{-1}$ of the classification rotor. The obtained Toner particle 1 had a weight-average particle diameter (D4) of 5.9 μm.

Production Example of Toner 1

| | |
|---|---|
| Toner particles 1 | 100 parts |
| External additive particles 1 for toner | 5.0 parts |

The above materials were mixed with a Henschel mixer FM-10C type (manufactured by Mitsui Miike Machinery Co., Ltd.) at a rotation speed of 30 $s^{-1}$ and a rotation time of 10 min to obtain a toner particle mixture 1.

Heat Treatment Process

Using the obtained toner particle mixture 1, heat treatment was performed with the surface treatment apparatus shown in the FIGURE to obtain toner 1. Table 2 shows the physical characteristics of the toner 1. The operating conditions for the heat treatment were as follows: feed amount=2 kg/hr, hot air temperature=150° C., hot air flow rate=6 $m^3$/min, cold air temperature=−5° C., cold air flow rate=2.5 $m^3$/min, blower air flow rate=11 $m^3$/min, and injection air flow rate=1 $m^3$/min.

Production Example of Toner 2 to 42

Toners 2 to 42 were produced in the same manner as in the production example of toner 1, except that the external additive for the toner, the presence/absence of the hot air treatment step, and the hot air temperature in the heat treatment step were changed to those shown in Table 2. Table 2 shows the physical characteristics of the toners 2 to 42.

TABLE 2

| | External additive | | | | |
|---|---|---|---|---|---|
| Toner No. | External additive for toner No. | Amount added (parts) | Presence/absence of heat treatment step | Hot air temperature (° C.) | Fixing ratio (%) |
| 1 | 1 | 5.0 | Presence | 150 | 45 |
| 2 | 2 | 0.5 | Presence | 150 | 35 |
| 3 | 3 | 10.0 | Presence | 150 | 50 |
| 4 | 3 | 10.0 | Presence | 130 | 20 |
| 5 | 3 | 10.0 | Presence | 125 | 19 |
| 6 | 3 | 10.0 | absence | — | 15 |
| 7 | 3 | 0.1 | absence | — | 18 |
| 8 | 3 | 20.0 | absence | — | 10 |
| 9 | 3 | 0.05 | absence | — | 19 |
| 10 | 3 | 21.0 | absence | — | 10 |
| 11 | 4 | 21.0 | absence | — | 10 |
| 12 | 5 | 21.0 | absence | — | 10 |
| 13 | 6 | 21.0 | absence | — | 10 |
| 14 | 7 | 21.0 | absence | — | 10 |
| 15 | 8 | 21.0 | absence | — | 10 |
| 16 | 9 | 21.0 | absence | — | 10 |
| 17 | 10 | 21.0 | absence | — | 10 |
| 18 | 11 | 21.0 | absence | — | 10 |
| 19 | 12 | 21.0 | absence | — | 10 |
| 20 | 13 | 21.0 | absence | — | 10 |
| 21 | 14 | 21.0 | absence | — | 10 |
| 22 | 15 | 21.0 | absence | — | 10 |
| 23 | 16 | 21.0 | absence | — | 10 |
| 24 | 17 | 21.0 | absence | — | 10 |
| 25 | 18 | 21.0 | absence | — | 10 |
| 26 | 19 | 21.0 | absence | — | 10 |
| 27 | 20 | 21.0 | absence | — | 10 |
| 28 | 21 | 21.0 | absence | — | 10 |
| 29 | 22 | 21.0 | absence | — | 10 |
| 30 | 23 | 21.0 | absence | — | 19 |
| 31 | 24 | 21.0 | absence | — | 5 |
| 32 | 25 | 21.0 | absence | — | 5 |
| 33 | 26 | 21.0 | absence | — | 5 |
| 34 | 27 | 21.0 | absence | — | 5 |
| 35 | 28 | 21.0 | absence | — | 10 |
| 36 | 29 | 21.0 | absence | — | 10 |
| 37 | 30 | 21.0 | absence | — | 13 |
| 38 | 31 | 21.0 | absence | — | 19 |
| 39 | 32 | 21.0 | absence | — | 11 |
| 40 | 33 | 21.0 | absence | — | 11 |
| 41 | 34 | 21.0 | absence | — | 19 |
| 42 | 35 | 21.0 | absence | — | 5 |

In the table, the amount added is the number of parts per 100 parts of toner particles.

Production Example of Carrier 1

Magnetite 1 (intensity of magnetization of 65 $Am^2$/kg in a 1000/4π (kA/m) magnetic field), having a number-average particle diameter of 0.30

Magnetite 2 (intensity of magnetization of 65 $Am^2$/kg in a 1000/4π (kA/m) magnetic field), having a number-average particle diameter of 0.50 μm.

Herein 4.0 parts of a silane compound (3-(2-aminoethylaminopropyl) trimethoxysilane) were added to 100 parts of each of the above materials, with high-speed mixing and stirring at 100° C. or above, inside the vessel, to treat the respective fine particles.

Phenol: 10 mass %

Formaldehyde solution: 6 mass % (formaldehyde 40 mass %, methanol 10 mass %, water 50 mass %)

Magnetite 1 treated with the above silane compound: 58 mass %

Magnetite 2 treated with the above silane compound: 26 mass %

Then 100 parts of the above materials, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried.

Next, the resulting product was dried under reduced pressure (5 mmHg or lower) at a temperature of 60° C., to yield a spherical Carrier 1 of magnetic body-dispersed type. The volume-basis 50% particle diameter (D50) of Carrier 1 was 34.2 μm.

Production Example of Two-Component Developer 1

Herein 8.0 parts of Toner 1 were added to 92.0 parts of Carrier 1, with mixing using a V-type mixer (V-20, by Seishin Enterprise Co., Ltd.), to obtain Two-component developer 1.

Production Example of Two-Component Developers 2 to 42

Two-component developers 2 to 42 were produced in the same way as in the production example of Two-component developer 1, but herein the toner was modified as given in Table 3.

TABLE 3

| Two-component developer No. | Toner No. | Carrier No. |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 13 | 13 | 1 |
| 14 | 14 | 1 |
| 15 | 15 | 1 |
| 16 | 16 | 1 |
| 17 | 17 | 1 |
| 18 | 18 | 1 |
| 19 | 19 | 1 |
| 20 | 20 | 1 |
| 21 | 21 | 1 |
| 22 | 22 | 1 |
| 23 | 23 | 1 |
| 24 | 24 | 1 |
| 25 | 25 | 1 |
| 26 | 26 | 1 |
| 27 | 27 | 1 |
| 28 | 28 | 1 |
| 29 | 29 | 1 |
| 30 | 30 | 1 |
| 31 | 31 | 1 |
| 32 | 32 | 1 |
| 33 | 33 | 1 |
| 34 | 34 | 1 |
| 35 | 35 | 1 |
| 36 | 36 | 1 |
| 37 | 37 | 1 |
| 38 | 38 | 1 |
| 39 | 39 | 1 |

TABLE 3-continued

| Two-component developer No. | Toner No. | Carrier No. |
|---|---|---|
| 40 | 40 | 1 |
| 41 | 41 | 1 |
| 42 | 42 | 1 |

Toner Evaluation Method

Measurement of Image Density Difference

A Canon full-color copier image Press C800 was used as an image forming apparatus, the two-component developer was placed in a cyan developing device of the image forming apparatus, and the toner was placed in a cyan toner container to perform the below-described evaluation. The apparatus was modified by attaching a mechanism for discharging the excess magnetic carrier contained inside the developing device from the developing device. As the evaluation paper, plain paper GF-0081 (A4, basis weight 81.4 $g/m^2$, sold by Canon Marketing Japan Inc.) was used.

The toner laid-on level on the paper in a FFh image (solid image) was adjusted to 0.45 $mg/cm^2$. FFh is a value obtained by displaying 256 gradations in hexadecimal, 00 h is the first gradation gradations (white background portion) of 256, and FF is the 256th gradation (solid portion) of 256 gradations. First, an image output test of 1000 images was performed with an image ratio of 1%. During the continuous passing of 1000 sheets, the sheets were passed under the same development conditions and transfer conditions (without calibration) as those of the first sheet.

After that, an image output test of 1000 images was performed with an image ratio of 80%. During the continuous passing of 1000 sheets, the sheets were passed under the same development conditions and transfer conditions (without calibration) as those of the first sheet. The density of the 1000-th image in printing at an image ratio of 1% was taken as the initial density, and the density of the 1000-th image in printing at an image ratio of 80% was measured and evaluated.

The above test was performed in a normal temperature and normal humidity environment (N/N; temperature 25° C., relative humidity 55%), in a high-temperature and high-humidity environment (H/H; temperature 30° C., relative humidity 80%), and in a low-temperature and low-humidity environment (L/L; temperature 15° C., relative humidity 10%). An X-Rite color reflection densitometer (500 series: manufactured by X-Rite, Inc.) was used, the initial density and the density of the 1000-th image in printing at an image ratio of 80% were measured, and ranking was performed according to the following criteria by using the difference Δ therebetween.

(Evaluation Criteria: Image Density Difference Δ)

A: less than 0.02

B: 0.02 or more and less than 0.05

C: 0.05 or more and less than 0.10

D: 0.10 or more and less than 0.15

E: 0.15 or more

Evaluation of Image Density Uniformity

A solid image was output after the 1000th image was output in printing with the image ratio of 80%, and a 2 cm square image was captured with a digital microscope. After performing 8-bit grayscale conversion of the captured image with Image-J, the density histogram was measured and the standard deviation was obtained. Ranking was performed according to the value of the standard deviation in accordance with the following evaluation criteria. The above test was performed in a normal temperature and humidity environment (N/N; temperature 25° C., relative humidity 55%), in a high-temperature and high-humidity environment (H/H; temperature 30° C., relative humidity 80%), and in a low-temperature and low-humidity environment (L/L; temperature 15° C., relative humidity 10%). D or higher was determined to be good.

A: Standard deviation less than 2.0

B: Standard deviation is 2.0 or more and less than 4.0

C: Standard deviation is 4.0 or more and less than 5.0

D: Standard deviation is 5.0 or more and less than 6.0

E: Standard deviation is 6.0 or more

Image Quality

A one-dot and one-space vertical line image was output after outputting the 1000th image and the solid image in printing with the image ratio of 80%. The value of Blur (a numerical value indicating how the lines are blurred as defined by ISO 13660) was used as an evaluation index for image quality. The Blur value was measured using a personal IAS (Image Analysis System) (manufactured by QEA). The above test was performed in a normal temperature and humidity environment (N/N; temperature 25° C., relative humidity 55%), in a high-temperature and high-humidity environment (H/H; temperature 30° C., relative humidity 80%), and in a low-temperature and low-humidity environment (L).⁄L; temperature 15° C., relative humidity 10%). The obtained Blur value was evaluated according to the following evaluation criteria. D or higher was determined to be good.

A: Blur value is less than 35 μm

B: Blur value is 35 μm or more and less than 38 μm

C: Blur value is 38 μm or more and less than 41 μm

D: Blur value is 41 μm or more and less than 44 μm

E: Blur value is 44 μm or more

Evaluation Results of Examples 1 to 34

Table 4 shows the evaluation results of Examples 1 to 34.

Evaluation Results of Comparative Examples 1 to 8

Table 4 shows the evaluation results of Comparative Examples 1 to 8.

TABLE 4

| | | Image density difference | | | | | | Image density uniformity | | | | | | Image quality | | | | | |
|---|---|---|---|---|---|---|---|---|---|---|---|---|---|---|---|---|---|---|---|
| Example | TD | HH | | LL | | NN | | HH | | LL | | NN | | HH | | LL | | NN | |
| No. | No. | Δ | Rank | Δ | Rank | Δ | Rank | SD | Rank | SD | Rank | SD | Rank | Bl | Rank | Bl | Rank | Bl | Rank |
| 1 | 1 | 0.01 | A | 0.01 | A | 0.01 | A | 1.4 | A | 1.5 | A | 1.2 | A | 30 | A | 28 | A | 28 | A |
| 2 | 2 | 0.01 | A | 0.01 | A | 0.01 | A | 1.5 | A | 1.5 | A | 1.2 | A | 30 | A | 28 | A | 28 | A |
| 3 | 3 | 0.01 | A | 0.01 | A | 0.01 | A | 1.8 | A | 1.6 | A | 1.2 | A | 30 | A | 28 | A | 28 | A |
| 4 | 4 | 0.02 | B | 0.01 | A | 0.01 | A | 1.9 | A | 1.6 | A | 1.3 | A | 31 | A | 29 | A | 28 | A |
| 5 | 5 | 0.02 | B | 0.01 | A | 0.01 | A | 2.0 | B | 1.7 | A | 1.3 | A | 31 | A | 30 | A | 28 | A |
| 6 | 6 | 0.02 | B | 0.01 | A | 0.01 | A | 2.1 | B | 1.8 | A | 1.3 | A | 31 | A | 30 | A | 29 | A |
| 7 | 7 | 0.02 | B | 0.02 | B | 0.01 | A | 2.1 | B | 1.8 | A | 1.4 | A | 32 | A | 31 | A | 29 | A |
| 8 | 8 | 0.02 | B | 0.02 | B | 0.01 | A | 2.2 | B | 1.9 | A | 1.4 | A | 32 | A | 32 | A | 29 | A |
| 9 | 9 | 0.02 | B | 0.03 | B | 0.01 | A | 2.3 | B | 2.0 | B | 1.4 | A | 33 | A | 33 | A | 29 | A |
| 10 | 10 | 0.03 | B | 0.03 | B | 0.01 | A | 2.5 | B | 2.2 | B | 1.4 | A | 33 | A | 34 | A | 29 | A |
| 11 | 11 | 0.03 | B | 0.03 | B | 0.01 | A | 2.6 | B | 2.5 | B | 1.5 | A | 34 | A | 35 | B | 29 | A |
| 12 | 12 | 0.03 | B | 0.04 | B | 0.01 | A | 2.8 | B | 2.9 | B | 1.5 | A | 35 | B | 35 | B | 29 | A |
| 13 | 13 | 0.03 | B | 0.04 | B | 0.01 | A | 3.0 | B | 3.1 | B | 1.5 | A | 35 | B | 35 | B | 29 | A |
| 14 | 14 | 0.04 | B | 0.05 | C | 0.01 | A | 3.1 | B | 3.5 | B | 1.5 | A | 36 | B | 36 | B | 30 | A |
| 15 | 15 | 0.04 | B | 0.05 | C | 0.01 | A | 3.2 | B | 3.9 | B | 1.6 | A | 36 | B | 36 | B | 30 | A |
| 16 | 16 | 0.04 | B | 0.05 | C | 0.01 | A | 3.3 | B | 4.0 | C | 1.6 | A | 36 | B | 37 | B | 30 | A |
| 17 | 17 | 0.04 | B | 0.06 | C | 0.01 | A | 3.5 | B | 4.1 | C | 1.6 | A | 37 | B | 37 | B | 30 | A |
| 18 | 18 | 0.04 | B | 0.06 | C | 0.01 | A | 3.6 | B | 4.2 | C | 1.6 | A | 37 | B | 38 | C | 30 | A |
| 19 | 19 | 0.05 | C | 0.06 | C | 0.01 | A | 3.9 | B | 4.2 | C | 1.7 | A | 37 | B | 38 | C | 31 | A |
| 20 | 20 | 0.06 | C | 0.07 | C | 0.01 | A | 4.0 | C | 4.2 | C | 1.7 | A | 37 | B | 38 | C | 31 | A |
| 21 | 21 | 0.07 | C | 0.07 | C | 0.01 | A | 4.1 | C | 4.3 | C | 1.7 | A | 38 | C | 38 | C | 31 | A |
| 22 | 22 | 0.08 | C | 0.08 | C | 0.01 | A | 4.2 | C | 4.3 | C | 1.7 | A | 38 | C | 38 | C | 31 | A |
| 23 | 23 | 0.09 | C | 0.08 | C | 0.01 | A | 4.3 | C | 4.4 | C | 1.7 | A | 38 | C | 38 | C | 31 | A |
| 24 | 24 | 0.09 | C | 0.09 | C | 0.01 | A | 4.4 | C | 4.4 | C | 1.8 | A | 39 | C | 38 | C | 32 | A |
| 25 | 25 | 0.10 | D | 0.09 | C | 0.01 | A | 4.5 | C | 4.5 | C | 1.8 | A | 39 | C | 39 | C | 32 | A |
| 26 | 26 | 0.10 | D | 0.10 | D | 0.01 | A | 4.6 | C | 4.5 | C | 1.8 | A | 39 | C | 39 | C | 32 | A |
| 27 | 27 | 0.11 | D | 0.10 | D | 0.01 | A | 4.9 | C | 4.6 | C | 1.8 | A | 39 | C | 39 | C | 32 | A |
| 28 | 28 | 0.11 | D | 0.10 | D | 0.01 | A | 5.0 | D | 4.7 | C | 1.8 | A | 40 | C | 39 | C | 33 | A |
| 29 | 29 | 0.12 | D | 0.11 | D | 0.01 | A | 5.1 | D | 4.9 | C | 1.9 | A | 40 | C | 39 | C | 33 | A |
| 30 | 30 | 0.12 | D | 0.11 | D | 0.01 | A | 5.2 | D | 5.0 | D | 1.9 | A | 40 | C | 39 | C | 33 | A |
| 31 | 31 | 0.13 | D | 0.12 | D | 0.01 | A | 5.3 | D | 5.1 | D | 1.9 | A | 40 | C | 40 | C | 34 | A |
| 32 | 32 | 0.13 | D | 0.12 | D | 0.01 | A | 5.5 | D | 5.2 | D | 1.9 | A | 41 | D | 40 | C | 34 | A |
| 33 | 33 | 0.14 | D | 0.13 | D | 0.01 | A | 5.6 | D | 5.5 | D | 1.9 | A | 42 | D | 41 | D | 34 | A |
| 34 | 34 | 0.14 | D | 0.14 | D | 0.01 | A | 5.8 | D | 5.9 | D | 1.9 | A | 42 | D | 42 | D | 34 | A |
| C.E. 1 | 35 | 0.14 | D | 0.15 | E | 0.01 | A | 5.9 | D | 6.0 | E | 1.9 | A | 43 | D | 45 | E | 34 | A |
| C.E. 2 | 36 | 0.15 | E | 0.14 | D | 0.01 | A | 6.0 | E | 5.9 | D | 1.9 | A | 45 | E | 43 | D | 34 | A |
| C.E. 3 | 37 | 0.16 | E | 0.19 | E | 0.11 | D | 6.8 | E | 6.8 | E | 5.1 | D | 49 | E | 49 | E | 43 | D |
| C.E. 4 | 38 | 0.18 | E | 0.18 | E | 0.12 | D | 6.9 | E | 6.8 | E | 5.2 | D | 50 | E | 51 | E | 43 | D |
| C.E. 5 | 39 | 0.07 | C | 0.19 | E | 0.01 | A | 4.2 | C | 6.9 | E | 1.9 | A | 41 | D | 48 | E | 34 | A |
| C.E. 6 | 40 | 0.17 | E | 0.07 | C | 0.01 | A | 6.7 | E | 4.7 | C | 1.9 | A | 46 | E | 38 | C | 34 | A |
| C.E. 7 | 41 | 0.19 | E | 0.18 | E | 0.01 | A | 6.8 | E | 6.9 | E | 1.9 | A | 43 | D | 42 | D | 34 | A |
| C.E. 8 | 42 | 0.14 | D | 0.13 | D | 0.01 | A | 5.8 | D | 5.9 | D | 1.9 | A | 48 | E | 49 | E | 34 | A |

In the Table, "TD No." indicates "Two-component developer No.", "C.E." indicates "Comparative Example", "SD" indicates "standard deviation", and "Bl" indicates Blur value (μm).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-009564, filed Jan. 25, 2021, Japanese Patent Application No. 2021-009603, filed Jan. 25, 2021, Japanese Patent Application No. 2021-141208, filed Aug. 31, 2021, and Japanese Patent Application No. 2021-211031, filed Dec. 24, 2021, which are hereby incorporated by reference herein in their entirety.

What is claimed is:

1. A fine particle, comprising:

a silicon polymer having a siloxane group and a silanol group;

the fine particle having a moisture adsorption amount of 1.0 to 22.0 mg/g at a temperature of 30° C. and a humidity of 80% RH, an amount of the silanol group of the fine particle measured by a titration method using KOH being 0.012 to 0.120 mmol/g; and a number average particle diameter of primary particle of the fine particle being 0.05 to 0.30 μm, wherein in a chart obtained by measurement of $^{29}$Si-NMR of the fine particle $S3/A \leq 0.40$ $0.20 \leq S4/A \leq 0.50$ and $0.40 \leq S2/A \leq 0.70$ where a total peak area corresponding to the silicon polymer is denoted by A, a peak area corresponding to a structure represented by formula (a) is denoted by S3, a peak area corresponding to a structure represented by formula (b) is denoted by S4, and a peak area corresponding to a structure represented by formula (c) is denoted by S2, (a)

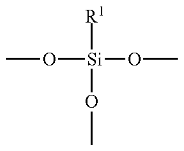

(b)

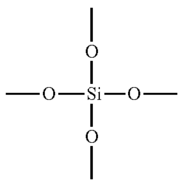

(c)

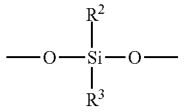

where $R^1$ represents an alkyl group having 1 to 6 carbon atoms, and $R^2$ and $R^3$ independently represent an alkyl group having 1 to 6 carbon atoms.

2. The fine particle according to claim 1, wherein the fine particle has a BET specific surface area of 30 to 250 $m^2/g$.

3. The fine particle according to claim 1, wherein the fine particle is surface-treated with at least one compound selected from the group consisting of an alkylsilazane, a cyclic dimethylpolysiloxane, a chlorosilane, a fluorosilane, and a silicone oil.

4. The fine particle according to claim 1, wherein the silicon polymer is a polycondensation polymer of at least one silicon compound selected from the group consisting of silicon compounds having a structure represented by formula (A):

(A)

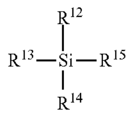

where $R^{12}$, $R^{13}$, $R^{14}$ and $R^{15}$ independently represent an alkyl group having 1 to 6 carbon atoms, a phenyl group or a reactive group, and the reactive group represents a halogen atom, a hydroxy group, an acetoxy group, or an alkoxy group having 1 to 6 carbon atoms; and at least one of $R^{12}$, $R^{13}$, $R^{14}$ and $R^{15}$ is the reactive group.

5. An external additive for toner, comprising:

a fine particle comprising a silicon polymer having a siloxane group and a silanol group;

the fine particle having a moisture adsorption amount of 1.0 to 22.0 mg/g at a temperature of 30° C. and a humidity of 80% RH, an amount of the silanol group of the fine particle measured by a titration method using KOH being 0.012 to 0.120 mmol/g; and a number average particle diameter of primary particle of the fine particle being 0.05 to 0.30 μm, wherein in a chart obtained by measurement of 29Si-NMR of the fine particle $S3/A \leq 0.40$ $0.20 \leq S4/A \leq 0.50$ and $0.40 \leq S2/A \leq 0.70$ where a total peak area corresponding to the silicon polymer is denoted by A, a peak area corresponding to a structure represented by formula (a) is denoted by S3, a peak area corresponding to a structure represented by formula (b) is denoted by S4, and a peak area corresponding to a structure represented by formula (c) is denoted by S2, (a)

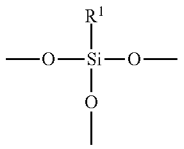

(b)

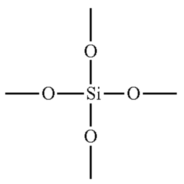

-continued (c)

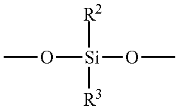

where $R^1$ represents an alkyl group having 1 to 6 carbon atoms, and $R^2$ and $R^3$ independently represent an alkyl group having 1 to 6 carbon atoms.

6. A toner comprising a toner particle and an external additive for toner, wherein the toner particle comprises a binder resin, and the external additive is the external additive for toner according to claim 5.

7. The toner according to claim 6, wherein an amount of the external additive in the toner is 0.1 to 20.0 parts by mass with respect to 100 parts by mass of the toner particle.

8. The toner according to claim 6, wherein a fixing ratio of the external additive to the toner particle is 20% or more, when the toner is dispersed in an aqueous medium including a surfactant and sucrose, shaken with a shaker, and then centrifuged.

9. A two-component developer, comprising:

a toner and a magnetic carrier;

the toner comprising a toner particle and an external additive for toner;

the toner particle comprising a binder resin;

the external additive comprising a fine particle of a silicon polymer having a siloxane group and a silanol group;

the fine particle having a moisture adsorption amount of 1.0 to 22.0 mg/g at a temperature of 30° C. and a humidity of 80% RH, an amount of the silanol group of the fine particle measured by a titration method using KOH being 0.012 to 0.120 mmol/g; and a number average particle diameter of primary particle of the fine particle being 0.05 to 0.30 μm, wherein in a chart obtained by measurement of 29Si-NMR of the fine particle $S3/A \leq 0.40$ $0.20 \leq S4/A \leq 0.50$ and $0.40 \leq S2/A \leq 0.70$ where a total peak area corresponding to the silicon polymer is denoted by A, a peak area corresponding to a structure represented by formula (a) is denoted by S3, a peak area corresponding to a structure represented by formula (b) is denoted by S4, and a peak area corresponding to a structure represented by formula (c) is denoted by S2, (a)

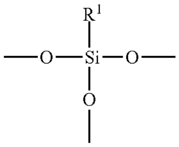

(b)

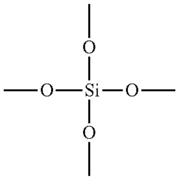

(c)

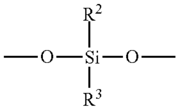

where $R^1$ represents an alkyl group having 1 to 6 carbon atoms, and $R^2$ and $R^3$ independently represent an alkyl group having 1 to 6 carbon atoms.

10. A method for manufacturing the toner according to claim 6, comprising the steps of:

mixing the toner particle and the external additive for toner to obtain a toner particle mixture; and heat-treating the toner particle mixture.

* * * * *